United States Patent
Kimball et al.

(10) Patent No.: US 12,430,126 B1
(45) Date of Patent: *Sep. 30, 2025

(54) OPTIMIZATION OF SOURCE CODE TO ADDRESS INEFFICIENCIES

(71) Applicant: Architecture Technology Corporation, Eden Prairie, MN (US)

(72) Inventors: Colleen Kimball, Eden Prairie, MN (US); Judson Powers, Eden Prairie, MN (US)

(73) Assignee: Architecture Technology Corporation, Eden Prairie, MN (US)

( * ) Notice: Subject to any disclaimer, the term of this patent is extended or adjusted under 35 U.S.C. 154(b) by 58 days.

This patent is subject to a terminal disclaimer.

(21) Appl. No.: 18/098,557

(22) Filed: Jan. 18, 2023

Related U.S. Application Data

(63) Continuation of application No. 17/353,501, filed on Jun. 21, 2021, now Pat. No. 11,599,356, which is a
(Continued)

(51) Int. Cl.
*G06F 8/72* (2018.01)
*G06F 8/34* (2018.01)
(Continued)

(52) U.S. Cl.
CPC .............. *G06F 8/72* (2013.01); *G06F 8/34* (2013.01); *G06F 8/42* (2013.01); *G06F 9/541* (2013.01);
(Continued)

(58) Field of Classification Search
CPC ..... G06F 8/72; G06F 8/34; G06F 8/42; G06F 9/541; G06F 11/302; G06F 11/3495; G06F 11/3688; G06N 20/00
See application file for complete search history.

(56) References Cited

U.S. PATENT DOCUMENTS 7,143,394 B1 * 11/2006 Shadmon ............ G06F 11/3612 717/130
7,350,192 B2   3/2008 Seitz et al.
(Continued)

OTHER PUBLICATIONS

"IT Glossary (/it-glossary/)," retrieved from https://www.gartner.com/it-glossary/legacy-application-or-system/ on Dec. 1, 2017, 2018, 3 pages.
(Continued)

*Primary Examiner* — Marina Lee
(74) *Attorney, Agent, or Firm* — Foley & Lardner LLP

(57) ABSTRACT

Disclosed herein are embodiments of systems, methods, and products for modernizing and optimizing legacy software. A computing device may perform an automated runtime performance profiling process. The performance profiler may automatically profile the legacy software at runtime, monitor the memory usage and module activities of the legacy software, and pinpoint/identify a subset of inefficient functions in the legacy software that scale poorly or otherwise inefficient. The computing device may further perform a source code analysis and refactoring process. The computing device may parse the source code of the subset of inefficient functions and identify code violations within the source code. The computing device may provide one or more refactoring options to optimize the source code. Each refactoring option may comprise a change to the source code configured to correct the code violations. The computing device may refactor the source code based on a selected refactoring option.

18 Claims, 20 Drawing Sheets

Related U.S. Application Data continuation of application No. 16/780,664, filed on Feb. 3, 2020, now Pat. No. 11,042,369.

(51) Int. Cl.
| | | |
|---|---|---|
| *G06F 8/41* | (2018.01) | |
| *G06F 9/54* | (2006.01) | |
| *G06F 11/30* | (2006.01) | |
| *G06F 11/34* | (2006.01) | |
| *G06F 11/3668* | (2025.01) | |
| *G06N 20/00* | (2019.01) | |

(52) U.S. Cl.
CPC ........ *G06F 11/302* (2013.01); *G06F 11/3495* (2013.01); *G06F 11/3688* (2013.01); *G06N 20/00* (2019.01)

(56) References Cited

U.S. PATENT DOCUMENTS

| | | | |
|---|---|---|---|
| 8,701,084 B1* | 4/2014 | MacDonald | G06F 8/20 717/113 |
| 9,535,821 B1* | 1/2017 | Delarue | G06F 11/3612 |
| 10,146,531 B2* | 12/2018 | Ghouti | G06F 8/72 |
| 10,324,712 B1 | 6/2019 | Nolan | |
| 10,534,604 B1* | 1/2020 | Kimball | G06F 8/427 |
| 10,558,458 B2* | 2/2020 | Iwanir | G06F 8/72 |
| 10,782,934 B1* | 9/2020 | Chawda | G06F 8/30 |
| 10,853,060 B2* | 12/2020 | Kimball | G06F 8/427 |
| 11,042,369 B1* | 6/2021 | Kimball | G06F 9/4843 |
| 11,599,356 B1* | 3/2023 | Kimball | G06F 11/3055 |
| 2007/0157178 A1 | 7/2007 | Kogan et al. | |
| 2008/0022266 A1 | 1/2008 | Hudson | |
| 2010/0042976 A1* | 2/2010 | Hines | G06F 8/72 717/127 |
| 2013/0174118 A1 | 7/2013 | Ziegler | |
| 2014/0282373 A1 | 9/2014 | Garza | |
| 2014/0282456 A1* | 9/2014 | Drost | G06F 8/76 717/158 |
| 2014/0331202 A1 | 11/2014 | Fukuda et al. | |
| 2015/0082276 A1* | 3/2015 | Balachandran | G06F 11/3604 717/112 |
| 2015/0234736 A1 | 8/2015 | Koju et al. | |
| 2015/0370690 A1* | 12/2015 | Rodmell | G06F 11/008 717/124 |
| 2016/0063107 A1 | 3/2016 | Schukovets et al. | |
| 2017/0242772 A1 | 8/2017 | Liu et al. | |
| 2017/0262567 A1 | 9/2017 | Vassiliev | |
| 2017/0315803 A1 | 11/2017 | Ghouti et al. | |
| 2018/0161678 A1 | 6/2018 | Snow et al. | |
| 2018/0255335 A1 | 9/2018 | George et al. | |
| 2019/0317760 A1 | 10/2019 | Kessentini et al. | |
| 2020/0074266 A1 | 3/2020 | Peake et al. | |
| 2020/0082735 A1 | 3/2020 | Nel et al. | |
| 2020/0093291 A1 | 3/2020 | Liu | |
| 2020/0097261 A1* | 3/2020 | Smith | G06F 40/174 |
| 2020/0110461 A1 | 4/2020 | Trim et al. | |
| 2020/0279205 A1 | 9/2020 | Gong et al. | |
| 2020/0293291 A1 | 9/2020 | Guan | |
| 2020/0334908 A1 | 10/2020 | Wilson et al. | |
| 2020/0357299 A1 | 11/2020 | Patel et al. | |
| 2020/0401386 A1* | 12/2020 | Punathil | G06F 8/433 |
| 2022/0008745 A1 | 1/2022 | Kirchner | |

OTHER PUBLICATIONS

Anderson, "Embedded Medical Device Software—How and Why to Use Static Analysis to Update Legacy Code," Embedded Systems Engineering, May 2015, 6 pages.

Architecture Technology Corporation, "Typhon APR a developer's tool suite for modernizing, optimizing, and maintaining legacy software," SBIR Topic: AF191-011 Pitch Day Investment in Digital Technology, Proposal No. F191-011-0062, Feb. 6, 2019, 15 pages.

Architecture Technology Corporation, "Typhon Integrated Software Design Description (SDD) and Interface Design Description (IDD)," Contract No. N68335-17-C-0601, Aug. 17, 2019, 37 pages.

Architecture Technology Corporation, "Typhon Software Product Specification (SPS)," Contact No. N68335-17-C-0601, Aug. 17, 2019, 20 pages.

Architecture Technology Corporation, "Typhon Software Requirements Specification (SRS)," Contract No. N68335-17-C-0601, Aug. 17, 2019, 26 pages.

Architecture Technology Corporation, "Typhon Software Version Description (SVD)," Contract No. A68335-17-C-0601, Aug. 17, 2019, 12 pages.

Cascioli, Phase I SBIR Proposal, "IBIS—International Biometric Screening," Topic Number and Name: A19-078—Data Sharing and Encryption, Feb. 6, 2019, 22 pages.

Dahyun Hollister, Phase I SBIR Proposal, "Virtual Training Environment Monitor," Topic Number and Name: A19-013, 24 pages.

Fowler, "Workflows of Refactoring," martinfowler.com, Jan. 8, 2014, 21 pages.

Fratini et al., "A Service Oriented Approach for the Interoperability of Space Mission Planning Systems," 4th Workshop on Knowledge Engineering for Planning and Scheduling, KEPS-2013, Jun. 2013, 6 pages.

Hoffman, "Air Force Awards Leidos $350M Joint Mission Planning System Integration IDIQ," govconwire.com, Dec. 9, 2016, 1 page.

Keller, "Navy Picks Nine Companies to Write and Maintain Software for Important Battle-Management Systems," militaryaerospace.com, Mar. 6, 2015, 7 pages.

Lecun et al., "How do you Teach a Machine?," The Wall Street Journal, Jun. 14, 2016.

Murphy-Hill, "The Past, Present, and Future of Refactoring," computers.org, Dec. 2015, 6 pages.

Non-Final Office Action on U.S. Appl. No. 16/780,582 Dtd Mar. 30, 2022.

Notice of Allowance on U.S. Appl. No. 16/780,664 Dtd Feb. 19, 2021.

US Final Office Action on U.S. Appl. No. 16/780,582 dated Sep. 15, 2022 (31 pages).

US Notice of Allowance on U.S. Appl. No. 17/353,501 dated Oct. 5, 2022 (18 pages).

Vecchio et al., "Digital Demand in the Banking Industry and the Impact on Legacy Systems," gartner.com, Jun. 15, 2016, 3 pages.

Zhang et al., "Migrating Legacy Applications to the Service Cloud," Conference Paper, OOPSLA 2009, Oct. 2009, pp. 59-67.

* cited by examiner

OPTIMIZATION OF SOURCE CODE TO ADDRESS INEFFICIENCIES

CROSS-REFERENCE TO RELATED APPLICATIONS

This application is a continuation of U.S. application Ser. No. 17/353,501, issued as U.S. Pat. No. 11,599,356, entitled "Systems and Methods for Legacy Source Code Optimization and Modernization," filed Jun. 21, 2021, which is a continuation of U.S. patent application Ser. No. 16/780,664, issued as U.S. Pat. No. 11,042,369, entitled "Systems and Methods for Modernizing and Optimizing Legacy Source Code," filed Feb. 3, 2020, each of which is incorporated by reference in its entirety.

This application relates to U.S. patent application Ser. No. 15/926,912, filed Mar. 20, 2018, entitled "Software Refactoring Systems and Methods," which is incorporated by reference in its entirety.

TECHNICAL FIELD

This application relates generally to methods and systems for modernizing and optimizing legacy source code.

BACKGROUND

Legacy software often refers to software that was originally written years or even decades ago that remains in production today. This software often includes programming languages and techniques that are outdated and/or inefficient compared to modern systems. Legacy software can be expensive to maintain, difficult to modernize, and often cannot take full advantage of the computing power of state-of-the-art hardware, software, and operating systems. As a result, legacy software is inefficient compared to modern software and may not be compatible with modern devices or meet desired software architecture goals. Much of the legacy code was written using programming techniques that are now considered to be outdated. In addition to catching up with changes in technology, the capacities of these software sometimes need to be improved to better fit the needs of modern use. In most cases, it is more feasible to maintain and upgrade the existing legacy software than it is to build a new software from scratch. This is because legacy software is often built on a giant code base. It may be easier/cheaper to maintain/update a code base of multiple millions of lines of code than to create a new one. Manual optimization and refactoring of legacy software can be an expensive process because of the large code base, often requiring the expertise of the original authors of the legacy code. Such expertise can be difficult to find.

A pervasive problem in legacy code, and in any large code base, is poor code quality. The poor quality can lead to unpredictable behavior in the software. From the user's perspective, the code may be exhibiting poor usage. From an adversary's perspective, it may serve as a target to exploit, stress or slow a system. A few examples of poor code quality include duplicate code, overly complicated coding patterns, and bloated code structures that are too large or perform more actions than is acceptable. These types of weaknesses appear frequently in legacy code largely due to the fact that it is very difficult to manually maintain a large code base and ensure that all components are appropriately updated for each new use case and/or software/hardware update. These types of weakness may not even be discovered until a user reports it or an adversary exploits it. This is particularly tricky when the developers who originally wrote the legacy code are no longer involved, which is most likely the case for legacy software. Developers with limited understanding of the original intent of the software may not be able to foresee a problem and may not know which parts of the legacy code are effective for the current software specifications and which parts should be rewritten. Legacy code may also contain code structures that were previously considered best coding practices, but are now considered outdated. One example is "goto" statements. "Goto" statements used to be more commonplace, but are now considered to be bad coding practice in most cases, as they can make code unnecessarily difficult to read. The more unreadable a code base is, the more difficult it becomes to identify and repair poor code quality. Furthermore, the original intent of legacy code may be different than the current intent. For example, a legacy software application may be built to be a standalone application on one machine. The original developers may make decisions with the assumption that there is only one user. In migrating the legacy software application to a new platform, the new intent of the software application may be to support multiple users. In that case, it's very likely that remnants of the original intent of only having one user would remain in the code after it has been migrated and can even cause efficiency and security issues.

Legacy software is not always fully optimized for the current operational hardware and operating system. Often, large parts of a legacy code base were optimized for the hardware and operating system on which they were originally developed. As a result, many algorithms in the code are non-optimal. A common example of this is the use of a single thread where multiple threads may be more efficient. If multithreading was not a viable option when the software was originally designed, due to hardware or software limitations, a legacy application may be performing several tasks on a single thread instead of performing them concurrently. Introducing parallelization in some of these instances could greatly improve the performance of the software.

Some algorithms in legacy code are inefficient because they were designed to address specific scenarios. As scenarios evolve, the algorithms should also evolve to reflect the current resources, limitations, and use cases. A common source of inefficiency in legacy software is an algorithm that improperly prioritizes low memory consumption over low computational complexity. Older hardware and operating systems had less memory consumption allowances than the state-of-the-art computing technologies used today. As a result, many legacy algorithms were written so that they minimize memory consumption, even at the expense of the time complexity of the function. This is especially true if the original developers did not envision that the input size of the algorithm would scale very large. Today, however, limitations on memory consumption are not as severe, and some problems scale a lot larger as technology becomes more integrated into operations. Algorithms that scale poorly will suddenly become very inefficient and difficult to use. In that case, refactoring to favor a small complexity timing over a small memory footprint would be more optimal.

SUMMARY

What is therefore desired is to have a system that automatically pinpoints poor quality and inefficient code of the legacy software. What is further desired is a system that provides automated solutions or actionable advice to optimize, modernize, and improve the readability of the legacy software.

Embodiments disclosed herein describe an automated profiling and refactoring (APR) system. The APR system disclosed herein may automate the process of refactoring, modernizing and optimizing legacy source code (e.g., legacy software). The APR software suit may comprise two separate tools: the automated runtime performance profiler and the source code analysis and refactoring tool. The performance profiler may automatically profile legacy software at runtime, pinpointing libraries, classes, and functions in the software that scale poorly or otherwise inefficient. The source code analysis and refactoring tool may statically analyze source code to identify improper coding practices and inefficient algorithms, providing automated solutions to transform the source code to remove or reduce the problem caused by improper practices and algorithms. The APR system may keep developers/users in-the-loop while making decisions about refactoring and targeting problem areas. The APR system may not only optimize and refactor code, but also provide assistance in transitioning the legacy software to a new language, architecture, or operating system.

In one embodiment, a computer-implemented method comprises receiving, by a computing device, user configuration through a graphical user interface to refactor software, the user configuration comprising one or more performance attributes of the software for refactoring; identifying, by the computing device, a subset of functions of the software corresponding to the one or more performance attributes for refactoring based on performing runtime performance profiling on the software, wherein the computing device launches the software and continuously monitors status data including memory usage and module activities of the software during the runtime performance profiling, wherein the computing device identifies the subset of functions corresponding to the one or more performance attributes of the software lower than a threshold based on the status data; identifying, by the computing device, code violations within source code of the subset of functions based on performing source code analysis according to a set of rules for code violation patterns; generating, by the computing device, one or more refactoring options to optimize the source code of the subset of functions on the graphical user interface, each refactoring option comprising a change to the source code configured to correct the code violations; and upon receiving a selected refactoring option, refactoring, by the computing device, the source code of the subset of functions to remove the code violations based on the selected refactoring option.

In another embodiment, a computer system comprises a non-transitory machine-readable media configured to store software; a computing device coupled to the non-transitory machine-readable media and comprising a processor configured to: receiving, user configuration through a graphical user interface to refactor the software, the user configuration comprising one or more performance attributes of the software for refactoring; identify a subset of functions of the software corresponding to the one or more performance attributes for refactoring based on performing runtime performance profiling on the software, wherein the processor launches the software and continuously monitors status data including memory usage and module activities of the software during the runtime performance profiling, wherein the processor identifies the subset of functions corresponding to the one or more performance attributes of the software lower than a threshold based on the status data; identify code violations within source code of the subset of functions based on performing source code analysis according to a set of rules for code violation patterns; generate one or more refactoring options to optimize the source code of the subset of functions on the graphical user interface, each refactoring option comprising a change to the source code configured to correct the code violations; and upon receiving a selected refactoring option, refactor the source code of the subset of functions to remove the code violations based on the selected refactoring option.

It is to be understood that both the foregoing general description and the following detailed description are exemplary and explanatory and are intended to provide further explanation of the disclosed embodiment and subject matter as claimed.

BRIEF DESCRIPTION OF THE DRAWINGS

The accompanying drawings constitute a part of this specification and illustrate embodiments of the subject matter disclosed herein.

Figure 5C:
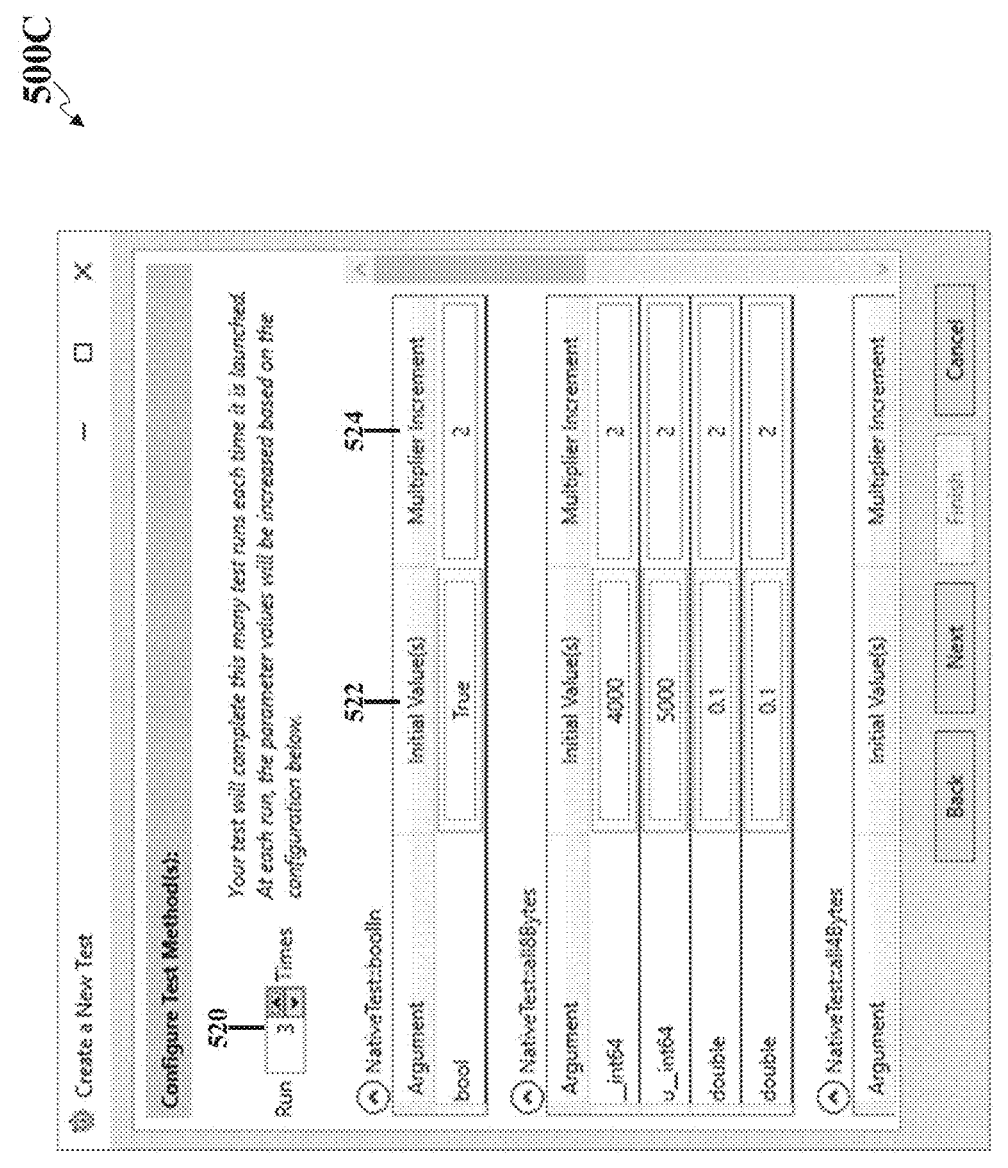

FIGS. 5A-5E illustrate graphical user interfaces for configuring the runtime performance profiling tests, according to an embodiment.

FIGS. 8A-8B illustrate graphical user interfaces for identifying code violations and configuring refactoring goals, according to an embodiment.

FIGS. 9A-1 to 9B-2 illustrate graphical user interfaces for refactoring the source code of the legacy software, according to an embodiment.

DETAILED DESCRIPTION

Figure 1:
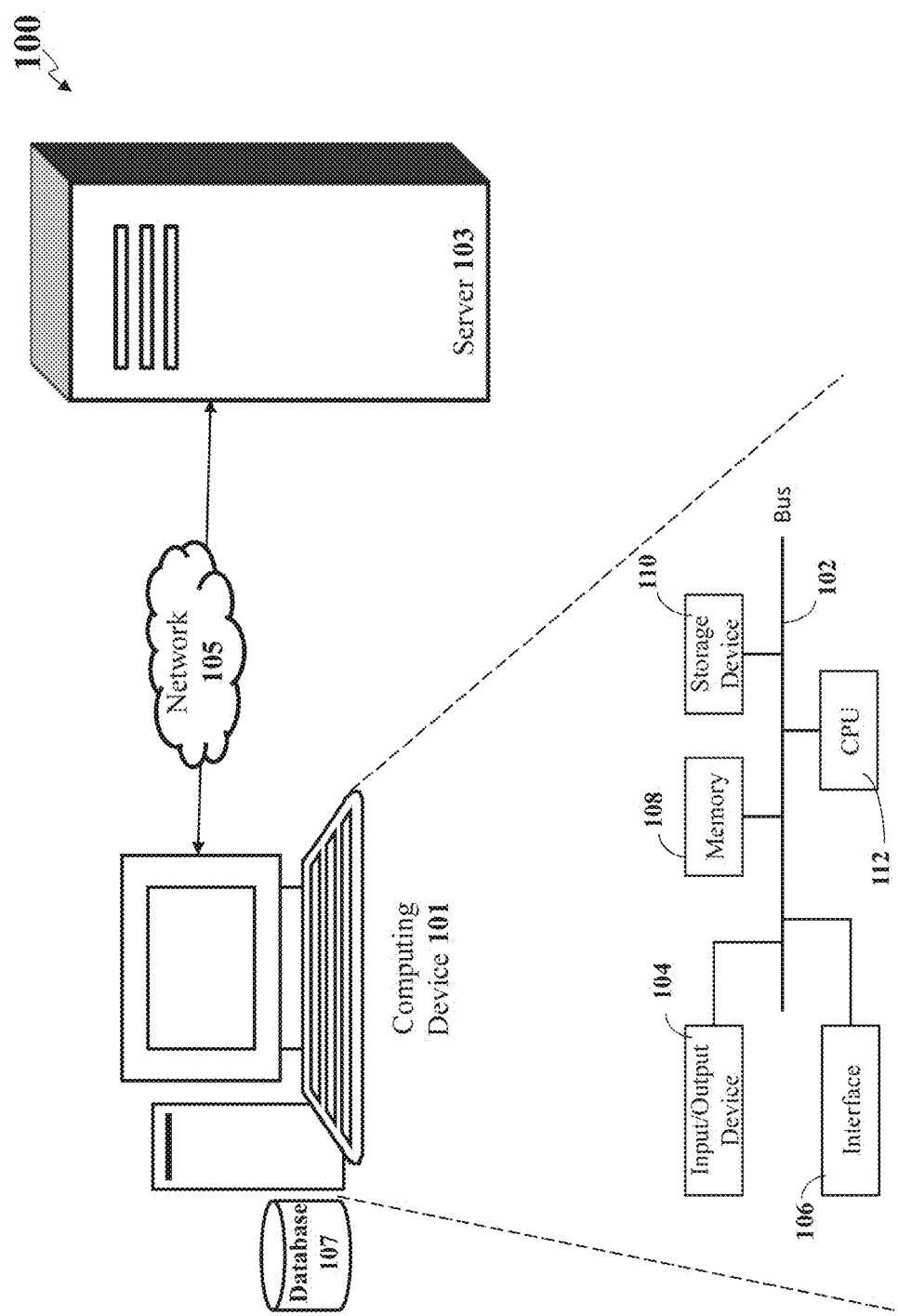
FIG. 1 illustrates a computer system for modernizing and optimizing legacy source code, according to an embodiment.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Embodiments disclosed herein provide a user-friendly optimization and modernization tool suit that automatically profiles and refactors legacy software (e.g., legacy software applications) with the developer-in-the-loop to improve the readability of the code and assist in transitioning the software to meet modern goals.

Embodiments disclosed herein describe a computing device performing runtime performance profiling process to identify a subset of inefficient functions. The subset of inefficient functions may cause the performance lag of the legacy software. The computing device may launch the legacy software by running the process of the legacy software. The computing device may continuously monitor the memory usage and module activities of the legacy software (e.g., software under test). The computing device may record the monitored raw data of the software status into raw data files. The computing device may read the collected status data from the raw data files, process the status data into useful performance statistics including timing and memory statistics. The computing device may construct the statistics for module, thread, and memory data. The computing device may store the processed data comprising the performance statistic into a database. Based on the analysis results of the runtime performance profiling, the computing device may quickly identify the inefficient functions that scale poorly and cause the poor performance in the targeted performance test or are otherwise data dependent.

Furthermore, the embodiments disclosed herein describe a source code analysis and refactoring process. The computing device may parse the source code of the subset of inefficient functions and identify refactoring opportunities using an artificial intelligence (AI) model. Specifically, the computing device may consult a set of rules for code violation identification that comprises a set of known improper coding patterns. Based on the rules for code violation identification, the computing device may identify structures in the source code that match those known improper coding patterns. The computing device may provide one or more refactoring options to optimize the source code of the inefficient functions. The computing device may generate refactoring options on a graphical user interface (GUI) for the user to select. Each refactoring option may comprise a change to the source code configured to remediate/correct the code violations. The user can then investigate each flagged code structure (e.g., code violation in the source code) and select one of the automatically generated code transformations (e.g., refactoring options) to resolve the problem and remove the code violations.

FIG. 1 shows an illustrative system 100 in which one or more embodiments of the present disclosure may operate. The system 100 may comprise a computing device 101 and a server 103 connected by a network 105. The computing device 101 may be any type of computer, including but not limited to, a desktop computer, a laptop computer, a tablet computer, and a smartphone. The server 103 may be any kind of computing device executing one or more server operations. The network 105 interconnecting the computing device 101 and the server 103 may be any kind of network, including but not limited to, a local area network (LAN), a metropolitan area network (MAN), a wide area network (WAN), and the Internet. For the ease of explanation, the below description includes details of various components of the computing device 101 and their respective functionalities. However, it should be understood that the components may be located anywhere within the system 100 and the corresponding functionality may be executed anywhere in the system 100.

In one embodiment, the computing device 101 includes bus 102, input/output (I/O) device 104, communication interface 106, memory 108, storage device 110 and central processing unit or processor 112. In another embodiment, computing device 101 includes additional, fewer, different, or differently arranged components than those illustrated in FIG. 1.

Bus 102 is in physical communication with (I/O) device 104, communication interface 106, memory 108, storage device 110, and central processing unit 112. Bus 102 includes a path that permits components within computing device 101 to communicate with each other. Examples of (I/O) device 104 include peripherals and/or other mechanisms that enable a user to input information to computing device 101, including a keyboard, computer mice, buttons, touch screens, voice recognition, and biometric mechanisms, and the like. (I/O) device 104 also includes a mechanism that outputs information to the user of computing device 101, such as, for example a display, a light emitting diode (LED), a printer, a speaker, and the like.

Examples of communication interface 106 include mechanisms that enable computing device 101 to communicate with other computing devices and/or systems through the network 105. Examples of memory 108 include random access memory 108 (RAM), read-only memory (ROM), flash memory, and the like. Examples of storage device 110 include magnetic and/or optical recording medium, ferroelectric RAM (F-RAM) hard disks, solid-state drives, floppy disks, optical discs, and the like. In one embodiment, memory 108 and storage device 110 store information and instructions for execution by central processing unit 112. In another embodiment, central processing unit (also referred to as a processor) 112 includes a microprocessor, an application specific integrated circuit (ASIC), or a field programmable object array (FPOA), and the like. In this embodiment, central processing unit 112 interprets and executes instructions retrieved from memory 108 and storage device 110.

The computing device 101 may be any computing device comprising a processor and non-transitory machine-readable storage medium. The examples of the computing device may include, but are not limited to, a personal digital assistant (PDA), a smartphone, a tablet computer, and the like. The computing device 101 may be a mobile device or handheld computer that provide a touchscreen interface with digital buttons and keyboard or physical buttons along with a physical keyboard. The computing device 101 may comprise any number of input and output devices supporting various types of data, such as text, image, audio, video, and the like.

The server 103 may be any computing device comprising a processor and other computing hardware and software components. The server 103 may be logically and physically organized within the same or different devices or structures, and may be distributed across any number of physical structures and locations (e.g., cabinets, rooms, buildings, cities). The server 103 may be a computing device comprising a processing unit. The processing unit may include a processor with computer-readable medium, such as a random access memory coupled to the processor. The server 103 may be running algorithms or computer executable program instructions, which may be executed by a single processor or multiple processors in a distributed configuration. The server 103 may be configured to interact with one or more software modules of a same or a different type operating within the system 100.

Non-limiting examples of the processor of the server 103 may include a microprocessor, an application specific integrated circuit, and a field programmable object array, among others. Non-limiting examples of the server 103 may include a server computer, a workstation computer, a tablet device, and a mobile device (e.g., smartphone). Some embodiments may include multiple computing devices functioning as the server 103. Some other embodiments may include a single computing device capable of performing the various tasks described herein.

In one embodiment, the computing device 101 may install a software application provided by the server 103. The software application may be an automated profiling and refactoring suite that automates the process of modernizing and optimizing the legacy source code. The computing device 101 may run the software application locally. In an alternative embodiment, the server 103 may execute the functionalities of the software applications.

The computing device 101 may run the automated profiling and refactoring suite that automates the process of modernizing and optimizing the legacy source code. Specifically, the computing device 101 may receive user configuration to refactor legacy software. The computing device 101 may create, configure, and launch profiling tests based on the user configuration to retrieve timing and memory data. The computing device 101 may perform runtime performance profiling process to identify a subset of inefficient functions. The subset of inefficient functions may cause the performance lag of the legacy software.

The memory 108 and/or the storage device 110 of the computing device 101 may store a plurality of legacy software applications. To refactor one of the legacy software based on the user configuration, the computing device 101 may launch the legacy software by running the process of the legacy software. The computing device 101 may continuously monitor the memory usage and module activities of the legacy software (e.g., software under test). The computing device 101 may record the monitored raw data of the software status into raw data files. The computing device may read the collected status data from the raw data files, process the status data into useful performance statistics including timing and memory statistics. The computing device 101 may construct the statistics for module, thread, and memory data. The computing device 101 may store the processed data comprising the performance statistic into a database 107. Based on the analysis results of the runtime performance profiling, the computing device 101 may quickly identify the inefficient functions that scale poorly and cause the poor performance in the targeted performance test or are otherwise data dependent.

The computing device 101 may analyze the processed data and display analysis results in the graphical user interface. The computing device 101 may generate data visualization and analysis results on a graphical user interface. The graphical user interface may comprise a number of tools include data visualizations and trend calculating tools to allow the user to review the analysis results from different angles. Users may also be able to track the success of refactoring efforts by viewing the difference in performance before and after refactoring was applied.

The database 107 may be any non-transitory machine-readable media configured to store the runtime performance profiling results. The database 107 may be part of the computing device 101. The database 107 may be a separate component in communication with the computing device 101. The database 107 may have a logical construct of data files, which may be stored in non-transitory machine-readable storage media, such as a hard disk or memory, controlled by software modules of a database program (e.g., SQL), and a database management system that executes the code modules (e.g., SQL scripts) for various data queries and management functions. If a user chooses to view a session/test that has already been completed, the computing device 101 may retrieve the processed data from the database 107.

After identifying the subset of inefficient functions, the computing device 101 may parse the source code of the subset of inefficient functions and identify refactoring opportunities using an artificial intelligence (AI) model. Specifically, the computing device 101 may use a front end compiler to generate an abstract syntax tree of the source code. The computing device 101 may traverse the abstract syntax tree to identify code violations based on the rules for code violation identification. The rules for code violation identification may comprise the code violation patterns, such as a set of known improper coding patterns. The computing device 101 may execute the AI model to determine the rules for code violation identification.

The computing device 101 may provide one or more refactoring options to optimize the source code of the inefficient functions. Each refactoring option may comprise a change to the source code configured to remediate/correct the code violations. The computing device 101 may determine the refactoring options based on the AI model. The AI model may determine and update the rules for refactoring. The rules for refactoring may comprise refactoring patterns and templates to correct the code violations.

The computing device 101 may generate refactoring options on a graphical user interface for the user to select. In some embodiments, the user may select one or more of the presented refactoring options for implementation. Upon receiving a selected refactoring option, the computing device 101 may refactor the source code of the inefficient functions to remove the code violations based on the selected refactoring option. For example, the computing device 101 may alter the source code according to the selected refactoring option to remove the code violations. In some other embodiments, the computing device 101 may automatically refactor the source code to remove the code violations based on the rules for refactoring.

For the ease of explanation, the functionalities of the automated profiling and refactoring application are executed on the computing device 101. However, in an alternative embodiment, the server 103 may execute the functionalities.

Figure 2:
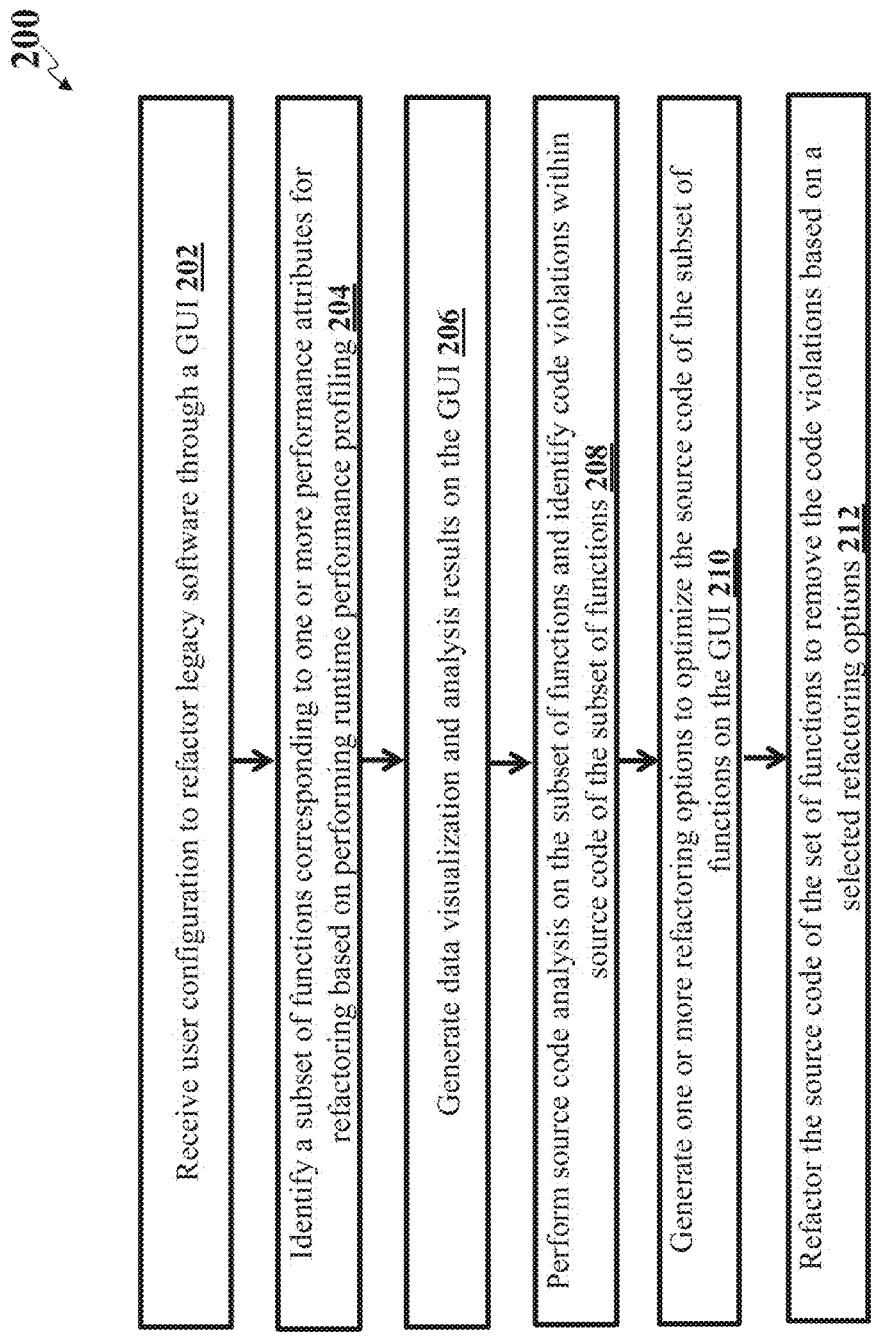
FIG. 2 illustrates a flowchart for modernizing and optimizing legacy source code, according to an embodiment.

FIG. 2 illustrates a flowchart 200 for modernizing and optimizing legacy source code, according to an embodiment. Other embodiments may comprise additional or alternative steps, or may omit some steps altogether.

At step 202, the computing device may receive user configuration to refactor legacy software (e.g., old and outdated program still used even though a newer and more efficient option is available), the user configuration comprising one or more performance attributes of the legacy software for refactoring. The user configuration may comprise refactoring requirement, such as refactoring priorities on one or more attributes of the legacy software. The configuration may indicate the target of the refactoring and/or the problems/issues in the legacy software that need to be refactored. The user configuration of refactoring priorities may pinpoint the most inefficient areas to focus on for refactoring. The users can configure their refactoring efforts to prioritize refactoring strategies that will best address their goals for the legacy software. For example, it may be advantageous for one legacy software to be transitioned from a component-based model to a service-oriented architecture. In this case, the priorities may include identifying areas in the source code and architecture of the legacy software that are incompatible with the service-oriented architecture, and refactoring it to become compatible. In another example, the legacy software may be exhibiting poor performance often. In this case, the refactoring priorities may be to identify the root of the poor performance and refactor the source code of the legacy software to become multithreaded or otherwise reduce the data-dependency of inefficient functions.

Different software modernization efforts may prioritize refactoring options differently, depending on the security or other requirements, the current state of the software, the future plans for the software, and others. In all cases, it is important to ensure the readability and maintainability of the legacy source code going forward.

The user configuration may comprise information for creating and configuring tests of the legacy software. A "test" represents a single configurable profiling session. Each test may be configured with specific instructions on how and what to profile. Each test may contain many test runs, where a "run" represents a set of profiling data from a single instance of a test launch. The user configuration for tests may comprise information about how a test is stored and how test runs are completed. Some of these information may include the directory to store test data, the executable and/or libraries to profile, the methods in those libraries to target, what type of profiling to perform (memory, performance, both), and any other information. If a test is configured to profile automatically, the configuration may also comprise automated test configuration details including a test library to invoke, methods in the test library to invoke, and parameters for those test methods.

The computing device may receive the user configuration through a graphical user interface (GUI). The GUI may provide the user with interactive component to configure a new test. For example, in the GUI, the user can follow a test creation wizard and fill in the necessary information to generate a new test. The user may configure profiling tests by targeting specific functions.

In some embodiments, users can launch and process tests from a command line API (application programming interface). The command line API may launch the test with the given instructions and complete the entire profiling session without any further interaction from the user. The command line API may be most useful for automated tests that require no GUI interaction At step 204, the computing device may identify a subset of functions of the legacy software corresponding to the one or more performance attributes for refactoring (e.g., refactoring requirements of the user configuration) based on performing runtime performance profiling on the legacy software. The computing device may launch the legacy software and continuously monitor status data including memory usage and module activities of the legacy software during the runtime performance profiling. The computing device may identify the subset of functions corresponding to the one or more performance attributes of the legacy software lower than a threshold based on the status data.

The subset of functions corresponding to the one or more performance attributes of the legacy software lower than a threshold may indicate a performance lag. The subset of functions may be inefficient functions that cause the problems/issues of the legacy software indicated in the refactoring priorities. For example, the user configuration may require the poor performance (e.g., performance lower than a threshold) of the legacy software to be refactored. The subset of functions identified may be inefficient functions that correspond to the poor performance or cause the poor performance.

The runtime analysis and performance profiling may pinpoint the areas of the application under test that should be the focus of the refactoring efforts. For example, the computing device may run a performance test in the performance profiler and determine that a subset of functions of the legacy software takes up an inordinate amount of the overall runtime of the application under test. The computing device may determine that the subset of functions correspond to the root of the poor performance.

The computing device may create, configure, and launch profiling tests based on the user configuration to retrieve timing and memory data. The computing device may maintain a test tree which is a hierarchical representation of all tests, where each test is a root and each run is the child of the test that it belongs to. The test tree may have a front end and a back end component. The back end maintains the actual directories that hold the test and run data. The front end allows the user to change the test and run directories including renaming and deleting test and run directories.

The computing device may launch the legacy software by running the process of the legacy software. The computing device may continuously monitor the memory usage of the legacy software (e.g., software under test) though a memory profiler. The computing device may also continuously monitor the modules of the legacy software through the module tracker as the running process of the software enters and exists each of the modules. In addition, the computing device may receive and collect the memory data, module data, function data, and any other status data of the software through a native profiler and a managed profiler. The managed profiler may profile managed function, module, and thread timing data. The native profiler may profile native function timing data. The various profilers may perform all timing and memory profiling of the legacy software.

The computing device may record the monitored raw data of the software status into raw data files. The computing device may read the collected status data from the raw data files, process the status data into useful performance statistics including timing and memory statistics. For example, in the raw data files for function performance, there are function enters, leaves, and exception handling records. The computing device may parse this data and construct complete function timing statistics by compiling all enters and leaves of each unique function and calculating the total time spent in each of those functions. The computing device may perform a similar process to construct the statistics for module, thread, and memory data. The computing device may store the processed data comprising the performance statistic into a database.

Based on the analysis results, the automated runtime performance profiling process may quickly identify the inefficient functions that scale poorly and cause the poor performance in the targeted performance test or are otherwise data dependent and provide the user with several tools and visualizations to analyze the results.

At step 206, the computing device may generate data visualization and analysis results on a graphical user interface. The computing device may analyze the processed data and display analysis results in the graphical user interface. The graphical user interface may comprise a number of tools include data visualizations and trend calculating tools to allow the user to review the analysis results from different angles. The computing device may generate data visualizations and trend calculations to depict the results of the tests as charts and graphs as well as displaying the numeric data results in an organized data grid format. The intuitive data visualizations may enable users to view how performance changes as input size increases. Users may also be able to track the success of refactoring efforts by viewing the difference in performance before and after refactoring was applied.

At step 208, the computing device may execute an artificial intelligence (AI) model to perform source code analysis on the subset of inefficient functions and identify code violations within the source code of the inefficient functions. The computing device may identify code violations within the source code of the subset of functions based on performing source code analysis according to a set of rules for code violation patterns. The computing device may perform source code analysis to analyze the subset of in efficient functions discovered to have poor performance and identify inefficiencies or other refactoring opportunities within the source code of subset of inefficient functions.

Specifically, after identifying the inefficient functions, the computing device may analyze the source code of the inefficient functions. The computing device may use a front end compiler to generate an abstract syntax tree of the source code. The abstract syntax tree may be a tree representation of the abstract syntactic structure of source code written in a programming language. Each node of the tree denotes a construct occurring in the source code. The computing device may traverse the abstract syntax tree to identify code violations based on the rules for code violation identification. The rules for code violation identification may comprise the code violation patterns.

The computing device may train the AI model to determine and update the rules for code violation identification. The AI model may learn from historical data on the code violations and the use's feedbacks on the identified code violations. For example, if the user consistently selects "do nothing" for certain types of code violations, the AI model may update the rules for code violation identification accordingly, such that those types of code violations are no longer identified.

At step 210, the computing device may execute the AI model to generate one or more refactoring options to optimize the source code of the inefficient functions. The computing device may generate refactoring options on a graphical user interface for the user to select. Each refactoring option may comprise a change to the source code configured to remediate/correct the code violations. The refactoring options may comprise refactoring suggestions to optimize the inefficient functions. The user may implement the refactoring suggestions automatically or manually to optimize the inefficient functions/algorithms.

After identifying the code violations included in the source code, the computing device may generate the refactoring options based on the rules for refactoring. The rules for refactoring may comprise refactoring patterns and templates to correct the code violations. Each refactoring option may include an indication of a particular code violation and suggested changes to correct or otherwise address that particular code violation. The computing device may display the refactoring options on the GUI for the user to select. In some embodiments, the user may select one or more of the presented refactoring options for implementation.

The computing device may train the artificial intelligence (AI) model to determine and update the rules for refactoring. The computing device may monitor and analyze the user selections of refactoring options for certain identified code violations. The computing device may train the artificial intelligence model by learning from the user selections of refactoring options and/or user manual refactoring operations for different code violations. For example, if the user does not select any of the refactoring options provided by the computing device and instead performs manual refactoring for certain types of code violations, the AI model may update the rules for refactoring by learning from the user's manual refactoring operations. For example, the AI model may include the user's manual refactoring operations as a new automatic refactoring option for those types of code violations.

The computing device may periodically retrain the AI model by learning from historical data on the code violations, the use's feedbacks and selections of refactoring options, and user manual refactoring operations for different code violations. The retrained AI model may update the rules for code violation identification and the rules for refactoring.

The computing device may train the AI model using one or more machine learning algorithms, such as decision tree learning, association rule learning, learning via artificial neural networks, inductive logic programming, support vector machines, clustering, Bayesian networks, reinforcement learning, representation learning, similarity and metric learning, sparse dictionary learning, genetic algorithms, rule-based machine learning, and the like.

At step 212, upon receiving a selected refactoring option, the computing device may refactor the source code of the inefficient functions to remove the code violations based on the selected refactoring option. Upon receiving the user selection of the one or more refactoring options, the computing device may implement the selected options to the legacy software. For example, the computing device may alter the source code according to the selected refactoring option to remove the code violations. In some other embodiments, the computing device may automatically refactor the source code to remove the code violations based on the rules for refactoring. Accordingly, the computing device may automatically correct certain types of code violations, while other code violations may be displayed to the user for manual correction or for correction by the software refactoring module after user selection.

Through combining the performance profiler and the source code analysis and refactoring, the computing device may maximize the refactoring efforts to resolve the worst inefficiencies (e.g., efficiencies lower than a threshold), speed up the optimization and/or modernization efforts and reduce human errors. The embodiments disclosed herein may support analysis of software at runtime and at the source code level, and support targeted refactoring of the worst performance functions (e.g., function performance lower than a threshold) in the legacy software.

Figure 3:
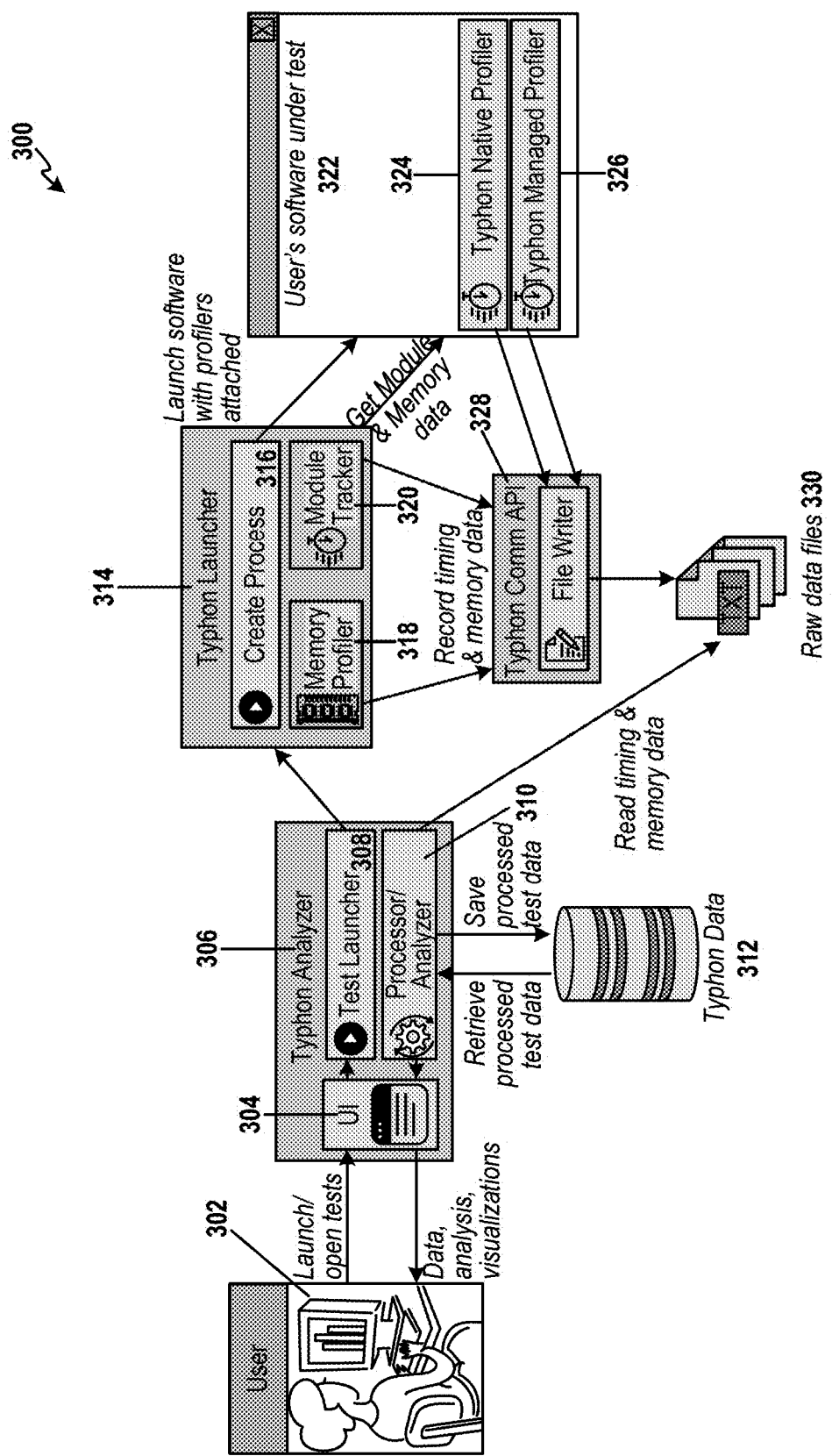
FIG. 3 illustrates a process of runtime performance profiling, according to an embodiment.

FIG. 3 illustrates the process of runtime performance profiling 300, according to an embodiment. The computing device 302 may receive the user configuration to launch/open tests for legacy software through a graphical user interface (GUI) 304. The computing device may launch the test 308 in the analyzer module 306. The analyzer module 306 may start the launcher module 314 that launches the software (e.g., legacy software, software under test) 322 with a native profiler 324 and a managed profiler 326 attached. The launcher module 314 may launch the software by creating process 316 or running the process of the software. The launcher module 314 may continuously monitor the memory use of the software under test through the memory profiler 318. The launcher module 314 may also continuously monitor the modules of the software under test through the module tracker 320 as the running process of the software enters and exists each of the modules. The launcher module 314 may receive and collect the memory data, module data, function data, and any other status data of the software through the native profiler 324 and the managed profiler 326. The launcher module 314 and the two profilers 324, 326 may record the monitored data into raw data files 330 using the communications API (application programming interface) 328. As the test finishes, the processing component 310 of the analyzer module 306 may read the collected status data from the raw data files 330, process the status data into complete timing and memory data, and save the processed data to the database 312. The computing device may analyze the processed data and display analysis results in the graphical user interface 304. The graphical user interface 304 may comprise a number of tools include data visualizations and trend calculating tools to allow the user to review the analysis results from different angles.

The analyzer module 306 may be the core component that creates and maintains profiling sessions. As a user launches a profiling session, the analyzer module 306 may start the launcher module 314. When the profiling session is completed the analyzer module 306 may process raw data files produced during profiling, generate data structures containing the profiling data, and save the processed data to the database 312. If a user chooses to view a session that has already been completed, the analyzer module 306 may retrieve the processed data from the database 312.

The GUI 304 may be a component the user interacts with to launch test and view results. The GUI 304 may provide the options for the user to create new profiling tests, launch profiling tests, and view completed results. The computing device may generate data visualizations and trend calculations to depict the results of the tests as charts and graphs as well as displaying the numeric data results in an organized data grid format. In some embodiments, the computing device may launch tests of the legacy software through a command line API during the runtime performance profiling. The embodiments disclosed herein may use the command line API as a second entry point to the analyzer module 306. The user may launch and process tests from the command line without having to interact with the GUI 304. The command line API may launch a test with the given instructions from the command line and complete the entire profiling session including launching the application and processing the results without any further interaction from the user.

The launcher module 314 may launch the software under test and attach the profiler component to the software under test. As the software under test runs, the launcher module 314 may continuously analyze the software and monitor/record the memory usage and module activities of the software. The launcher module 314 may continuously monitor the memory usage (e.g., memory profiler 318) of the software under test. The launcher module 314 may also continuously monitor the modules (e.g., module tracker 320) of the software under test as the running process of the software enters and exists each of the modules. In addition, the launcher module 314 may set up the profiling environment by loading and initializing the native profiler 324 and the managed profiler 326 that profile inside the launched program. The various profilers may perform all timing and memory profiling of the legacy software. The memory profiler 318 and module tracker 320 may perform continuously inside the launcher module 314 and profile all memory data and module data. The managed profiler 326 may profile managed function, module, and thread timing data. The native profiler 324 may profile native function timing data.

Both the memory profiler 318 and the module tracker 320 may run in a continuous loop while the launched legacy software is active. The memory profiler 318 may retrieve the total memory used by the launched software every x milliseconds, where x is defined by the user's test configuration. The module tracker 320 may track the stack of native modules active in the launched software at any given time. As new modules are added to the stack, the module tracker 320 may report a "module enter" event with the time recorded to the communications API 328. As modules are removed from the stack, the module tracker 320 may report a "module leave" event with the time recorded.

The other profiler component may contain a native profiler 324 that profiles native binaries, and a managed profiler 326 that profiles managed binaries. The profilers 324, 326 may read text files listing the functions the user wants to target. The profilers 324, 326 may record the start and end times of those selected functions. The native profiler 324 may include the function hooking software unit. When the native profiler is loaded, the native profiler 324 may instrument the targeted binaries by inserting code at the beginning and end of the targeted functions defined in the test configuration. The inserted code or "function hook" may create a jump to a function that reports either "function enter" or "function leave" with the function information and time recorded to the communications API 328.

The managed profiler 326 may receive callbacks for every function entered or left but only record selected functions and functions called inside of those selected functions. The managed profiler 326 may record other data regarding managed modules and threads. The managed profiler 326 may use function enter and leave callbacks as well as exception handling callbacks to record function enters, leaves, and exceptions that interrupt normal function stacks. The managed profiler 326 may also maintain a shadow stack to use as a reference when resolving corrupted stacks. The managed profiler 326 may report function enters and leaves to the communications API 328 if they are the functions targeted in the test configuration or the children of those functions. The managed profiler 326 may also record managed module enters and leaves to maintain a stack similar to the native profiler 324. Furthermore, the managed profiler 326 may record thread data when a thread is created, started, and destroyed. The managed profiler 326 may report both module and thread data to the communications API 328 along with the timing data (e.g., start and end time) of the list of functions.

The communications API 328 may perform all recording of raw data. Each test run has a set of text files that hold the raw data from that run. The profilers 324, 326 and launcher module 314 may record the raw data and call on the communications API 328 to write the raw data into the raw data files 330 in a thread safe critical section. The communications API 328 may create several raw data files 330 to which all timing and memory data for a run will be recorded. Before recording, the communications API 328 may initiate a thread safe critical section to ensure no file input/output errors or other errors.

The processing component (e.g., processor/analyzer) 310 of the analyzer module 306 may read the collected status data from the raw data files 330, process the status data into complete timing and memory data, and save the processed data to the database 312. The processing component 310 may read in the raw data files 330 and process the data into useful performance statistics including timing and memory statistics. For example, in the raw data files 330 for function performance, there are function enters, leaves, and exception handling records. The processing component 310 may parse this data and construct complete function timing statistics by compiling all enters and leaves of each unique function and calculating the total time spent in each of those functions. The processing component 310 may perform a similar process to construct the statistics for module, thread, and memory data.

The test database 312 may store the profiling data for each test. After processing the raw profiling data, the computing device may write the processed data into the database 312. If the user requests data from an already processed run, the computing device may retrieve that run data from the test database 312.

In some embodiments, the user may provide one or more test libraries comprising test methods. In such user configurations, the launcher module 314 may launch automated invoker component (not shown). The automated invoker may invoke methods in the user test libraries so users can perform automated profiling without interacting with the software under test directly. The automated invoker may locate the methods in the user's test library and invoke those methods automatically without launching the software under test. The invoker may use the automated test configuration to identify each test method that the user chooses to invoke. The automated invoker may invoke each test method with the default parameters defined in the configuration. If the automated invoker is set to perform multiple runs, each successive run may invoke the methods similarly, but may increase the value of each of the parameters, based on the user's configuration. For example, if the user configured the test to double inputs at each run, the automated invoker may invoke a method with an integer argument of 100 on the first run and 200 on the second run.

The automated runtime performance profiling process may quickly identify functions that scale poorly or are otherwise data dependent and provide the user with several tools and visualizations to analyze the results.

Figure 4:
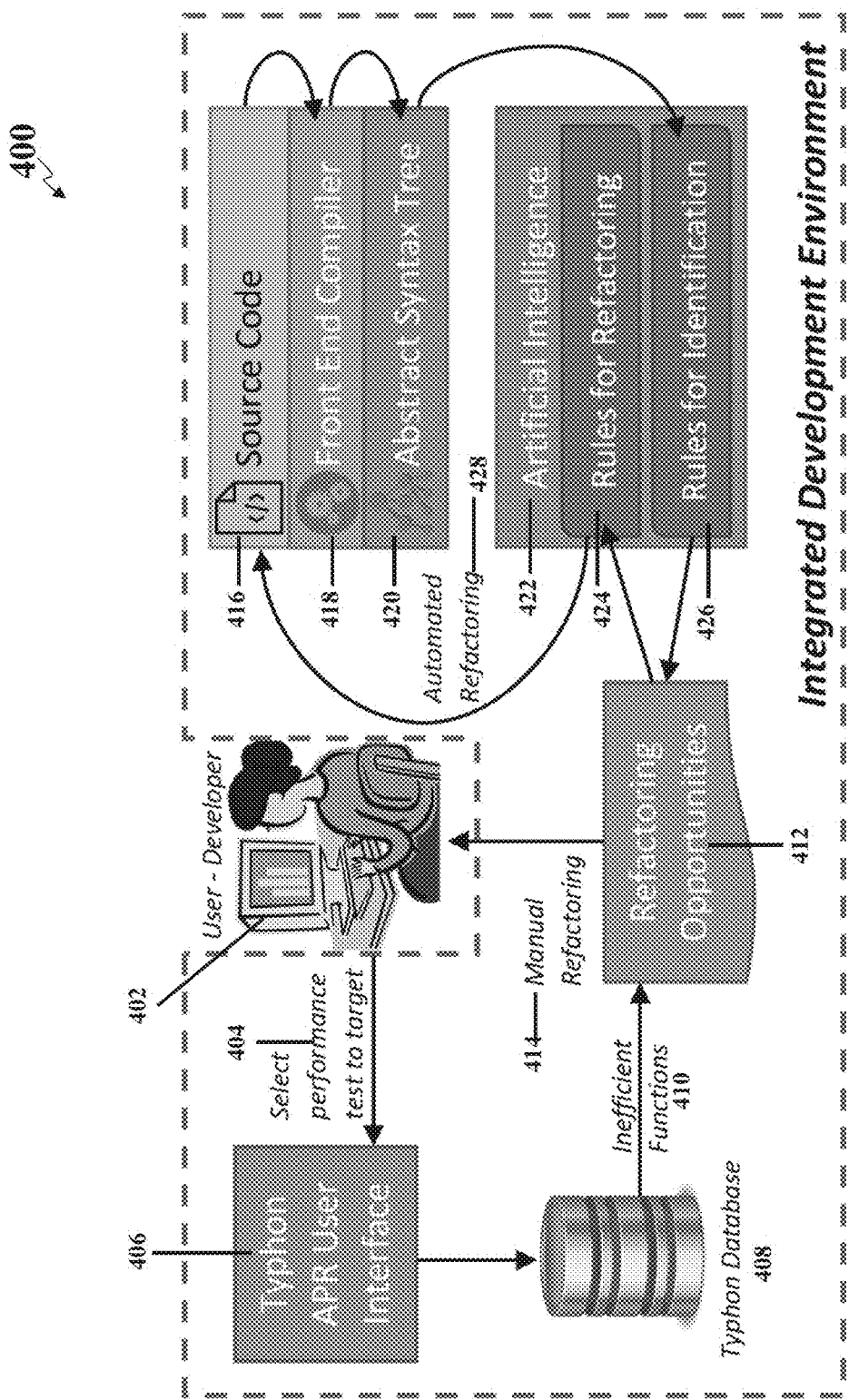
FIG. 4 illustrates a source code analysis and refactoring process, according to an embodiment.
Figure 5A:
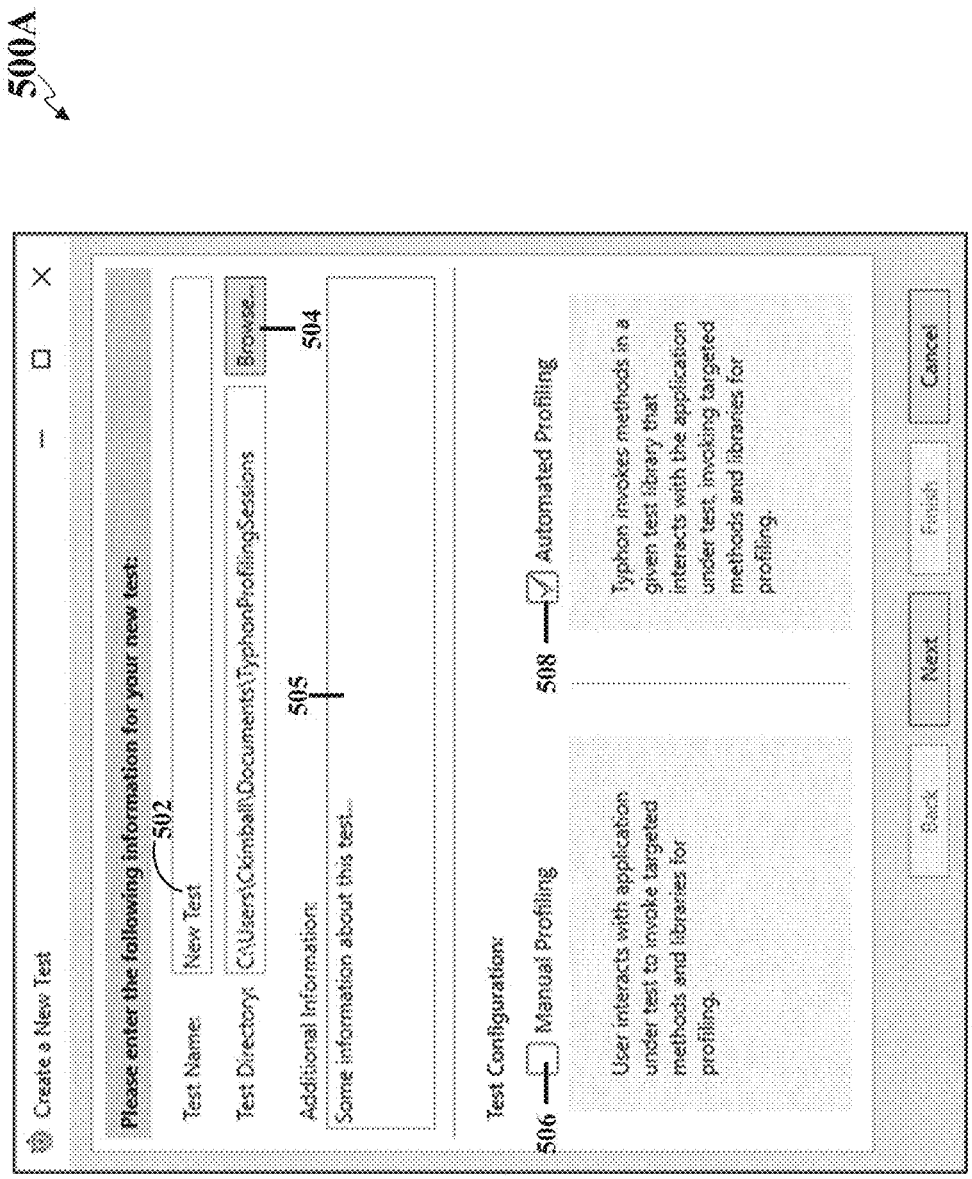
Figure 5B:
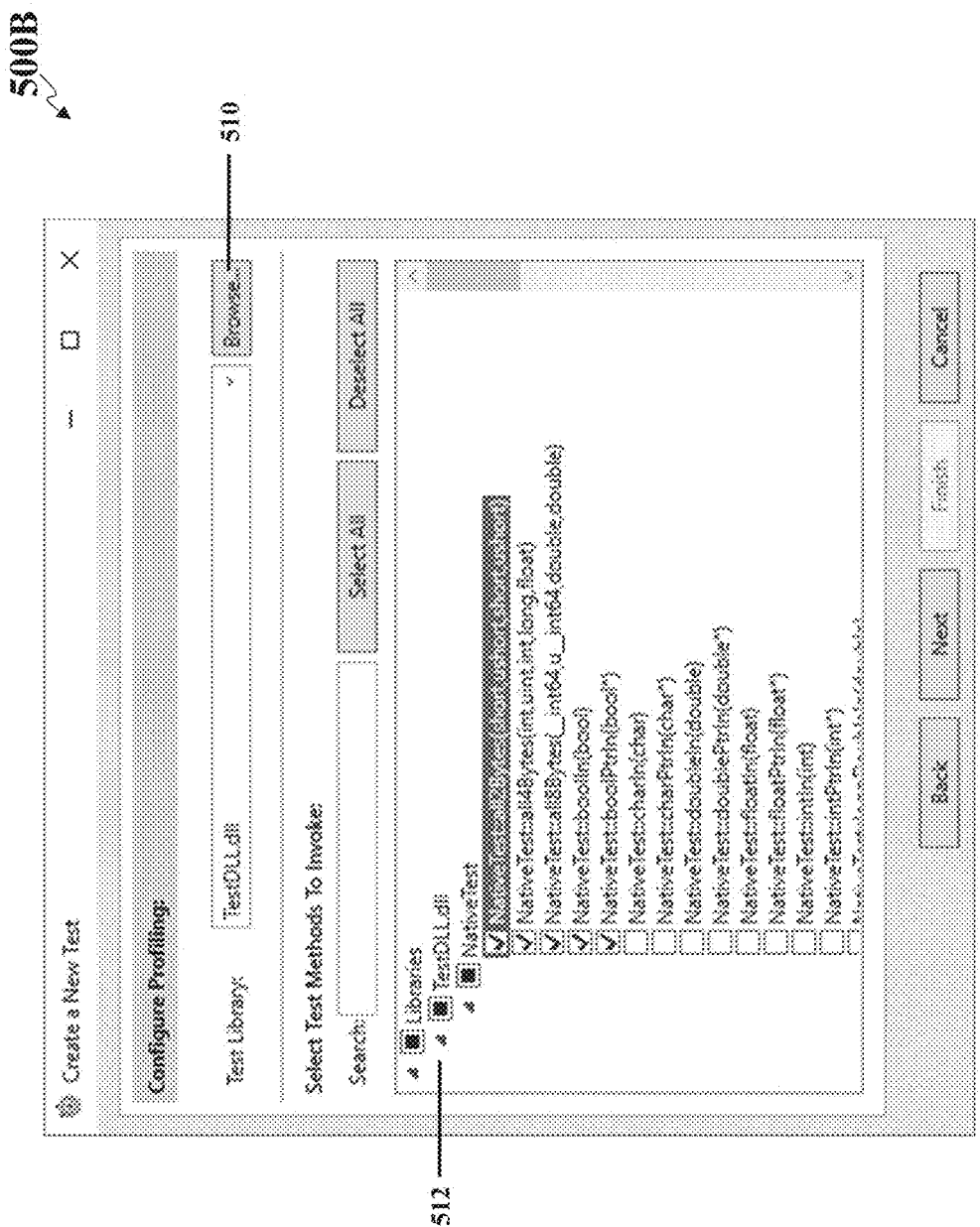
Figure 5D:
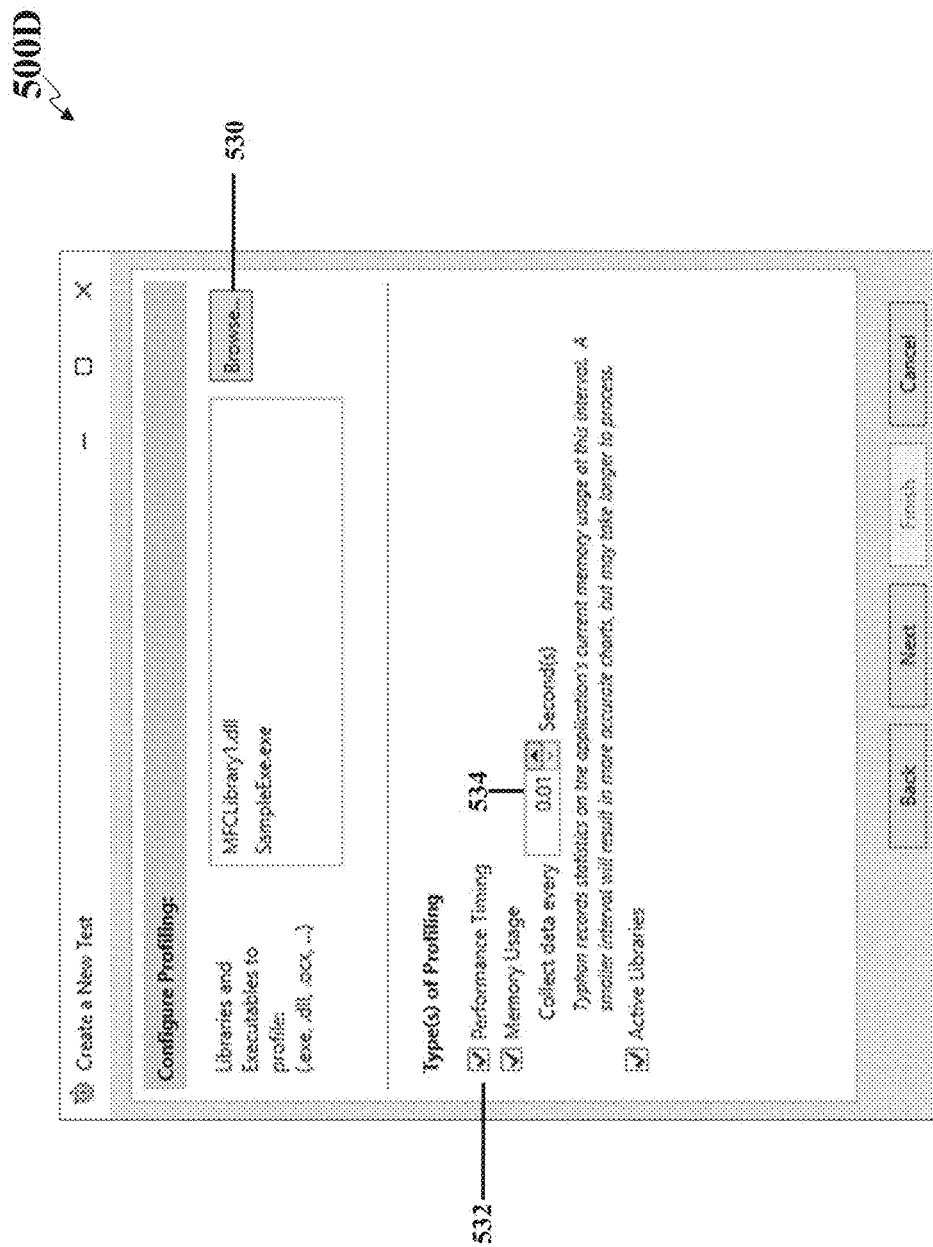
Figure 5E:
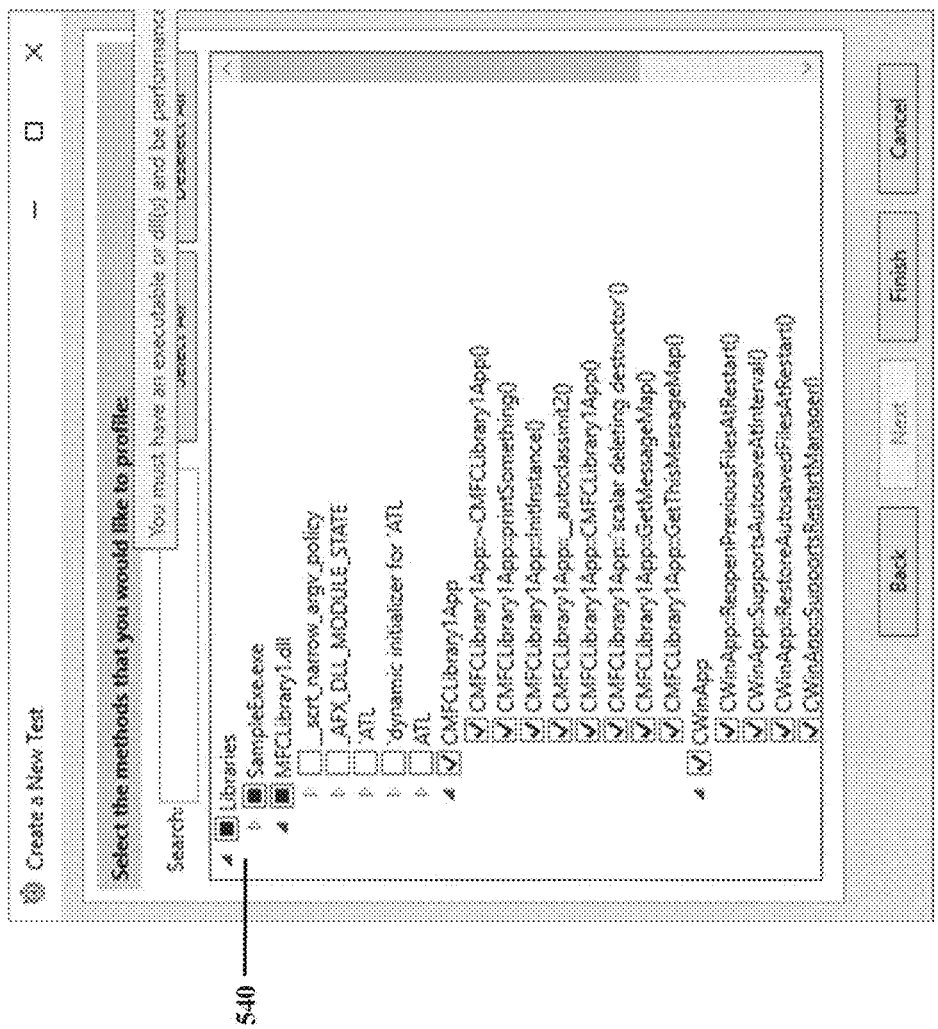

FIG. 4 illustrates the source code analysis and refactoring process 400, according to an embodiment. The user may input user configuration and select performance test to target 404 for legacy software through the graphical user interface 406 displayed on the computing device 402. The computing device may perform automated runtime performance profiling process as described in FIG. 3. Specifically, the computing device may create, configure, and launch profiling tests based on the user configuration to monitor timing and memory data. The computing device may process the monitored raw status data and save the processed data into the database 408. The processed data may comprise the analysis results of the automated runtime performance profiling. Based on the analysis results of the runtime performance profiling, the computing device may identify the inefficient functions 410 that scale poorly and cause the poor performance in the targeted performance test. After identifying the inefficient functions 410, the computing device may analyze the source code of the inefficient functions 410 and provide refactoring opportunities 412 for the user to select. The refactoring opportunities 412 may comprise refactoring suggestions/options to optimize the inefficient functions. The user may implement the refactoring suggestions manually 414 to optimize the inefficient functions. Alternatively, the computing device may implement the refactoring suggestions automatically 428.

To generate the refactoring opportunities 412, the computing device may analyze the source code 416 of the inefficient functions 410. Specifically, the computing device may use a front end compiler 418 to generate an abstract syntax tree 420 of the source code 416. The abstract syntax tree 420 may be a tree representation of the abstract syntactic structure of source code written in a programming language. Each node of the tree denotes a construct occurring in the source code. The computing device may traverse the abstract syntax tree 420 to identify code violations based on the rules for identification 426.

The rules for identification 426 may comprise the code violation patterns. For example, some code violation patterns may be configured to identify extraneous (e.g., "bloated") code, such as functions that have too many lines (e.g., more than 50 significant lines), functions that are configured to receive too many parameters (e.g., more than five parameters), code structure patterns that are repeated throughout the code and could be their own functions, source code structures that are "dead code" (meaning they are never entered when the application is running), code structures that inefficiently create, manipulate, or query data structures, code structures that fail to clean up memory it allocates, or conditional statements that are nested too many levels deep (e.g., more than three layers deep). Other code violation patterns may be configured to identify architectural issues that may inhibit migration (e.g., architectural issues that may be refactored to affect migration) to a service-oriented architecture, such as services that communicate with other external services without using proper encapsulation through an interface, functionality that is repeated across multiple services when one service should perform that single action, services that are not abstracted (meaning consumers are aware of their inner logic), or services that depend on one or more separate services to complete their functionality. In some embodiments, the code violation patterns may be associated with converting the legacy software program to a different code architecture (e.g., a service-oriented architecture). In one example, the code violation patterns may comprise aspects of software program that present an incompatibility with or obstacle to migration of the legacy software program to a service-oriented architecture.

After identifying the code violations included in the source code 416, the computing device may generate the refactoring opportunities 412 based on the rules for refactoring 424. The rules for refactoring may comprise refactoring patterns and templates to correct the code violations. For example, the rules for code violation identification 426 may defines the maximum number of lines in a particular function. If the source code of a particular function exceeds the pre-determined maximum number of lines. The rules for refactoring 424 may automatically change the source code of that function. For example, the rules for refactoring 424 may create a new sub-function with a subset of the source code, remove the subset of the source code from the function, and instead call that new sub-function, thereby reducing the number of lines in the function.

The refactoring opportunities 412 may present one or more refactoring options. Each refactoring opportunity 412 may include an indication of a particular code violation and suggested changes to correct or otherwise address that particular code violation. The computing device may display the refactoring opportunities 412 on the GUI for the user to select. In some embodiments, the user may select one or more of the presented refactoring options for implementation. Upon receiving the user selection of the one or more refactoring options, the computing device may implement the selected option to the legacy software. For example, the computing device may alter the source code according to the selected refactoring suggestion to remove the code violations. In some other embodiments, the computing device may automatically refactor 428 the source code to remove the code violations based on the rules for refactoring 424.

Accordingly, the computing device may automatically correct certain types of code violations, while other code violations may be displayed to the user for manual correction or for correction by the software refactoring module after user selection.

The computing device may train an artificial intelligence (AI) model 422 to determine/update the rules for refactoring 424 and the rules for identification 426. The computing device may monitor and analyze the user selections of refactoring options for certain identified code violations. The computing device may train the artificial intelligence model 422 by learning from the user selections of refactoring options and/or user manual refactoring operations for different code violations. For example, if the user consistently selects "do nothing" for certain types of code violations, the AI model 422 may update the rules for code violation identification 426 accordingly, such as those types of code violations are no longer identified. In another example, if the user consistently selects a particular refactoring option for certain types of code violations, the AI model 422 may update the rules for refactoring 424 accordingly, such that those types of code violations may be automatically refactored instead of refactored in response to user selection. In yet another example, if the user does not select any of the refactoring options provided by the computing device and instead performs manual refactoring for certain types of code violations, the AI model 422 may update the rules for refactoring 424 by learning from the user's manual refactoring operations. For example, the AI model 422 may include the user's manual refactoring operations as a new automatic refactoring option for those types of code violations.

By performing the source code analysis and refactoring, the embodiments disclosed herein may remediate/correct code violations included in the inefficient functions of the legacy software. As a result, the embodiments disclosed herein may reduce the cost of modernizing and optimizing legacy source code, which may facilitate an easier, more automated transition from legacy architecture to a more modern architecture.

FIGS. 5A-5E illustrate the graphical user interfaces 500A-500E for configuring the runtime performance profiling tests, according to an embodiment. The GUI 500A may be an initial user interface for creating one or more profiling test. The GUI 500A may comprise a text box 502 that allows the user to input the text name and an interactive component (e.g., button) 504 that allows the user to browse files in the computing device and define the test directory. The GUI 500A may comprise another text box 505 that allows the user to input additional information about the test. The GUI 500A may also comprise interactive components (e.g., radio buttons, checkboxes) 506, 508 that correspond to two options for profiling: manual profiling and automated profiling.

The GUI 500B may be a user interface for configuring the profiling. The GUI 500B may comprise a button 510 that allows the user to browse the files and select a test library. The GUI 500B may also comprise a file directory user interface 512 that allows the user to select test methods to invoke. The file directory user interface 512 may include all the methods, threads, and functions under the selected test library. The test methods may interact with the legacy software application (e.g., the software under test).

The GUI 500C may be a user interface for configuring the test methods. The GUI 500C may comprise an interactive component 520 that allows the user to select the number of run times for each test method. For each parameter of a test method, the GUI 500C may comprise a first input field 522 for the user to input an initial value of a parameter and a second input field 524 for the user to input a multiplier increment value of the parameter.

The GUI 500D may be a user interface for configuring the types of profiling. The GUI 500D may comprise a button 530 that allows the user to browse the files on the computing device and define the targeted libraries and executable applications/methods in the legacy software to be profiled/tested. The GUI 500D may also comprise a multi-selection menu 532 that allows the user to select the types of profiling (the type of status data to be monitored), including performance timing, memory usage, and active libraries. The user may also be able to configure the frequency of collecting memory usage by interacting with a selection-based component (e.g., dropdown menu) 534.

The GUI 500E may be a user interface for selecting targeted methods to be profiled. The GUI 500E may comprise another file directory user interface 540 that allows the user to select the targeted methods to be tested and profiled. The file directory user interface 540 may include all the methods of the targeted library in the legacy software.

Figure 6:
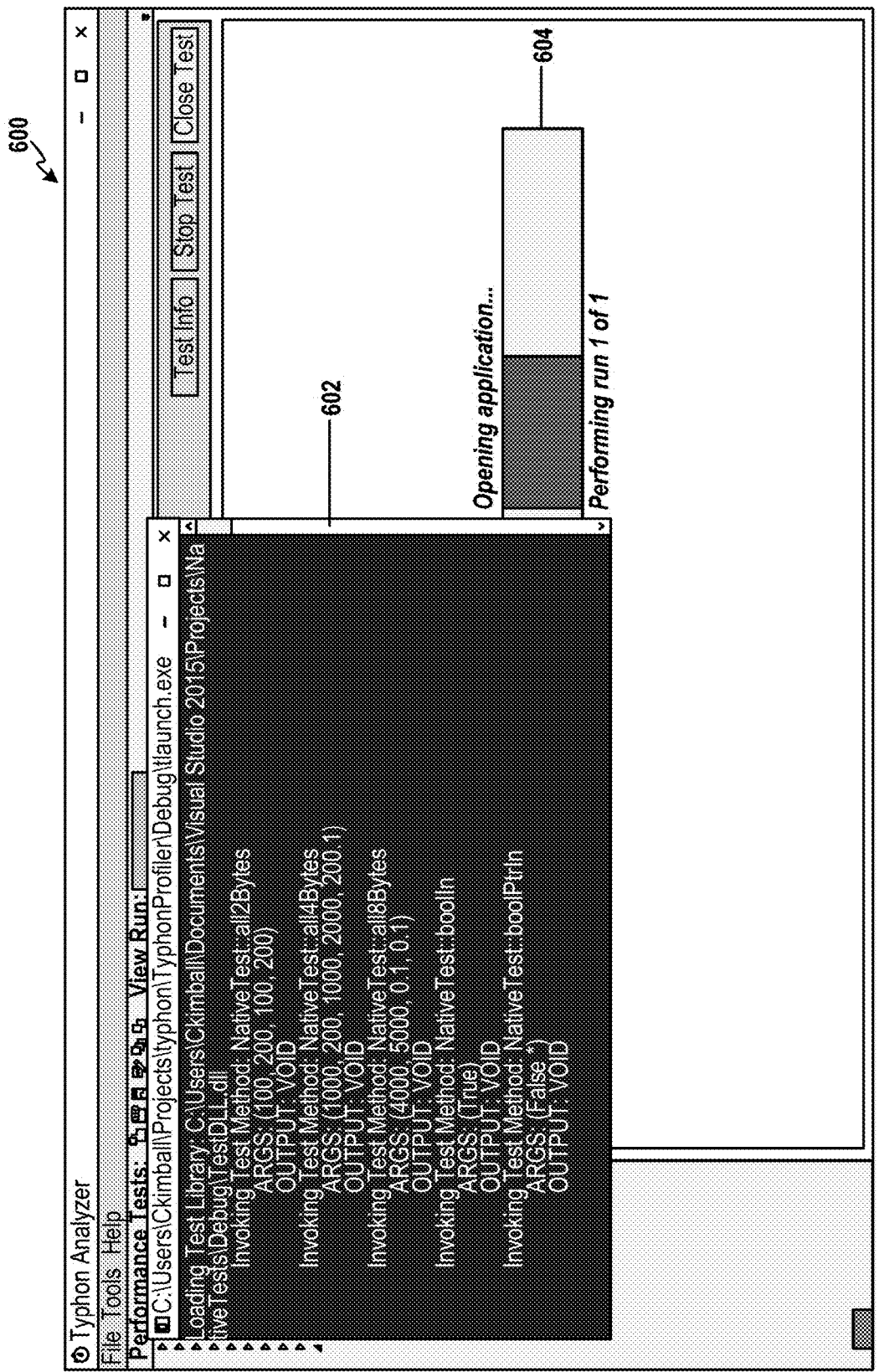
FIG. 6 illustrates a graphical user interface showing an automated test in action, according to an embodiment.
Figure 7A:
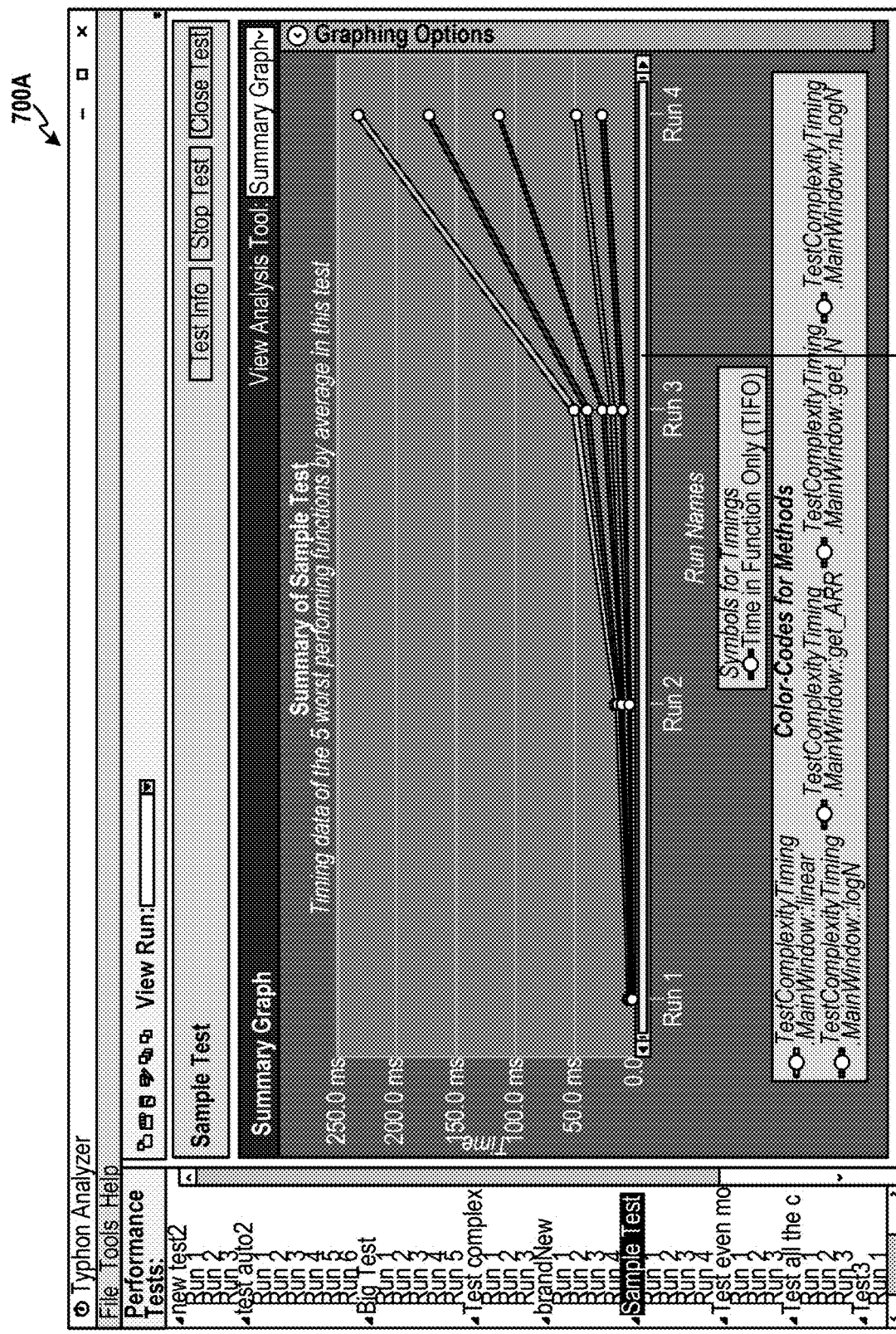
FIGS. 7A-7D illustrate graphical user interfaces for displaying the data visualization and analysis results of the runtime performance profiling, according to an embodiment.
Figure 7B:
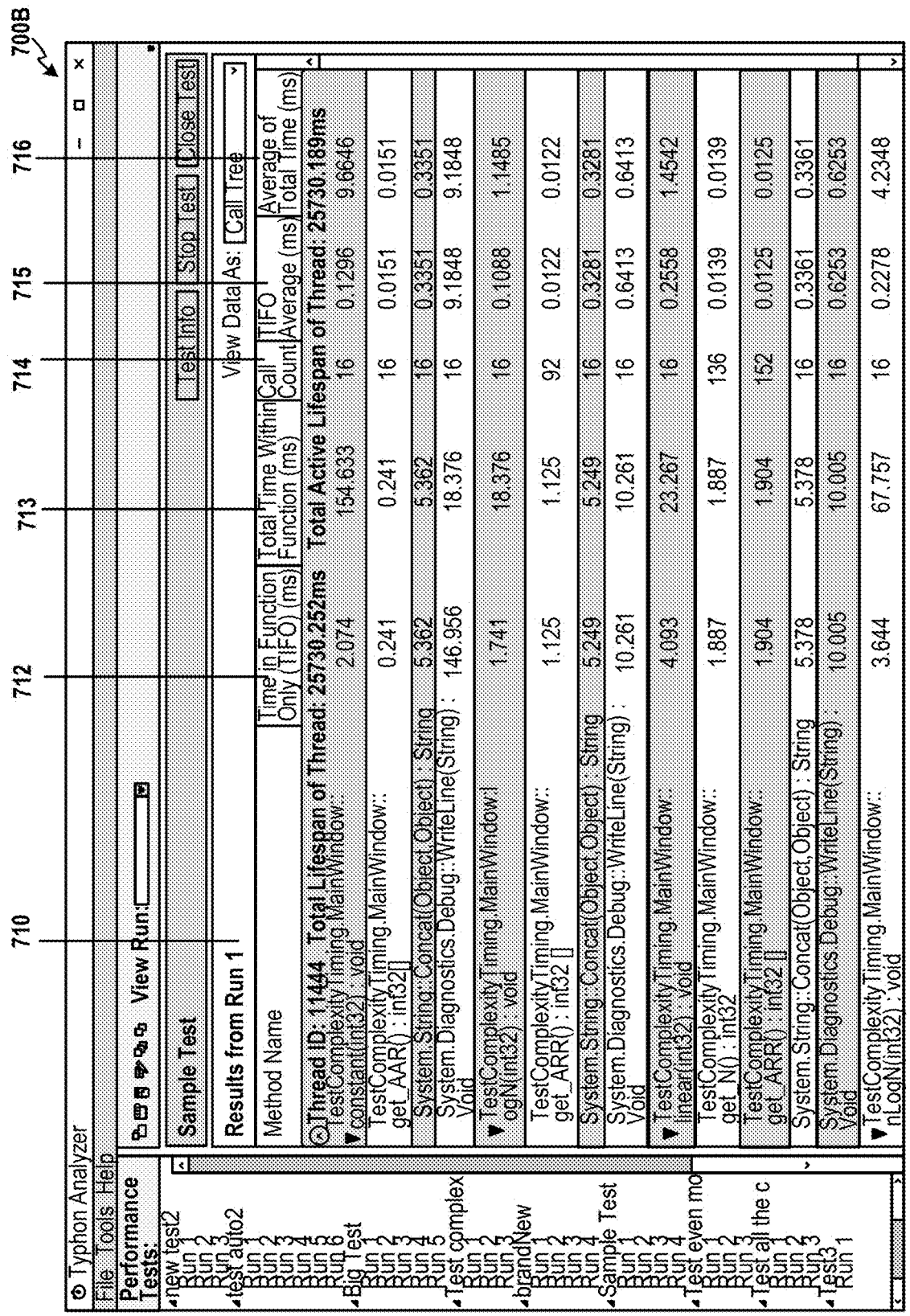
Figure 7C:
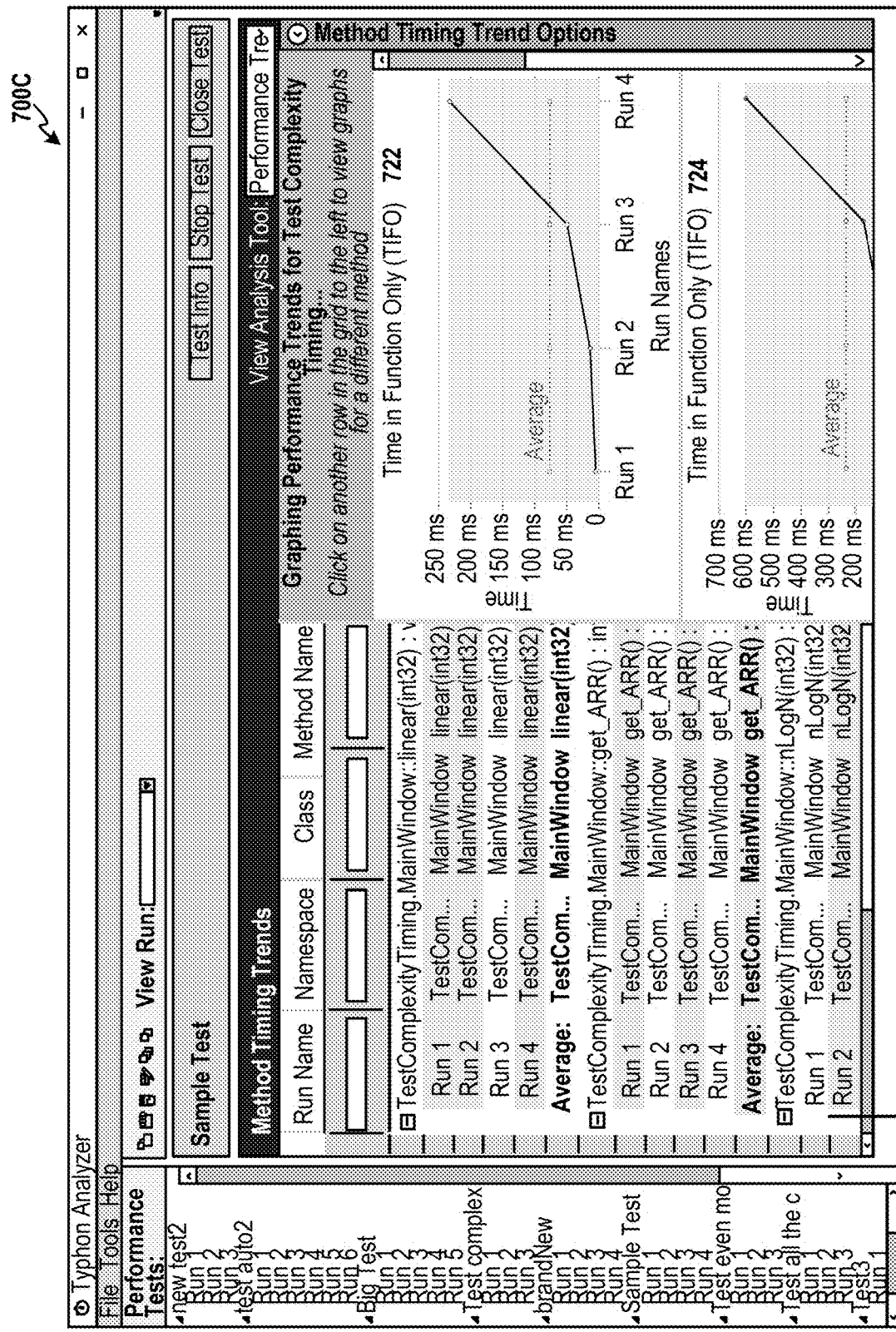
Figure 7D:
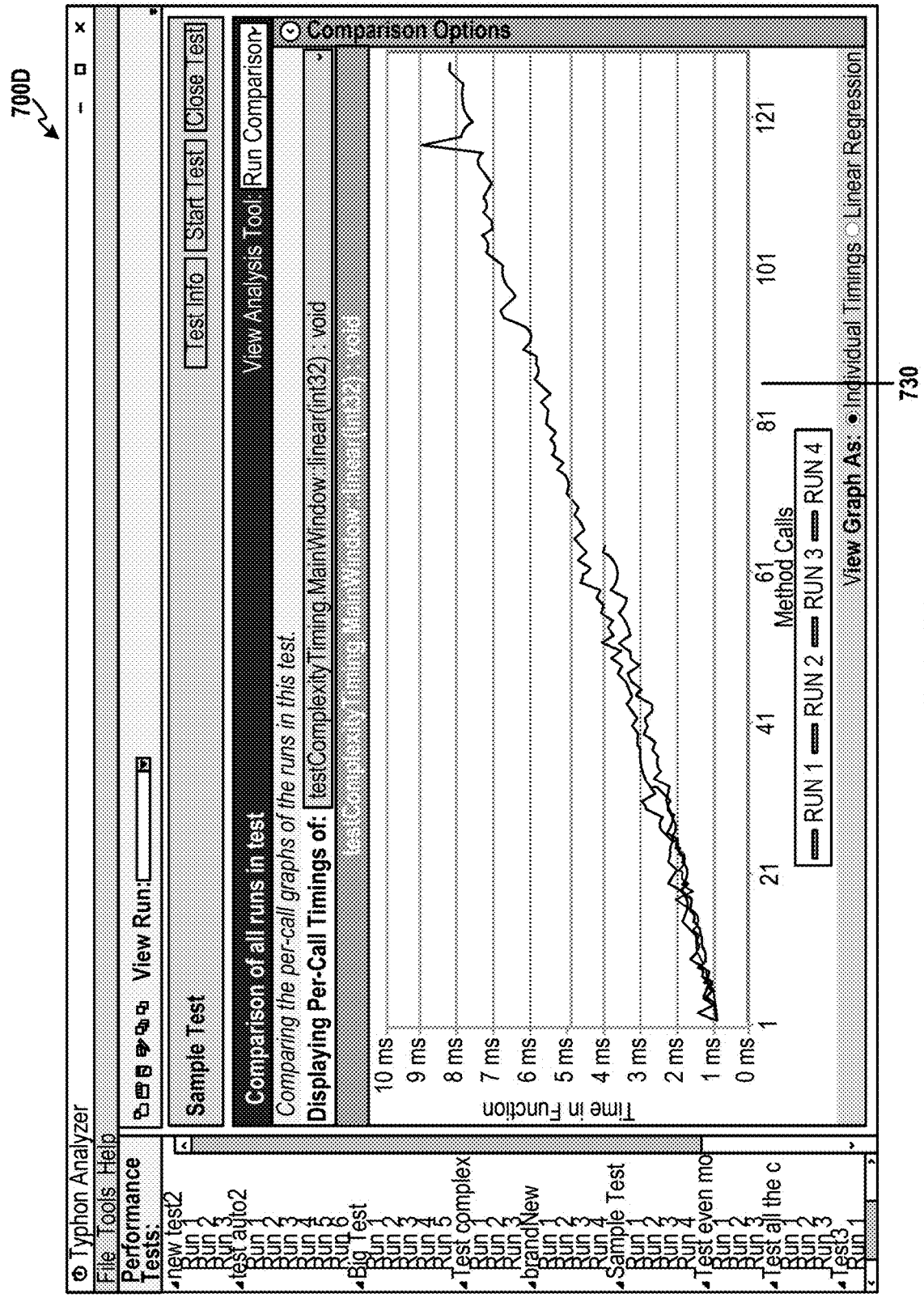

FIG. 6 illustrates a graphical user interface 600 showing an automated test in action, according to an embodiment. The window 602 shows that the application under test is being invoked using the values configured by the user. Specifically, the window 602 shows the record for each test method that has been invoked. The record for each test method may comprise the method being invoked, the arguments sent into the method during the execution of the invoked method, and the output of the method after the invocation (e.g., when the invocation is complete, during the execution). The computing device may also provide the process of the test session in a progress bar 604.

FIGS. 7A-7D illustrate graphical user interfaces 700A-700D for displaying the data visualization and analysis results of the runtime performance profiling, according to an embodiment. The GUI 700A may comprise the summary of timing data of five worst performing functions. The GUI 700A may display the timing data of each function as a line in a chart/graph 702. The GUI 700B may comprise the timing data of each function/method and display the numeric data results in an organized data grid format. For example, the GUI 700B may display the timing data of each function in a table 710. The table may display each method/function identifier in each row. For each method/function, the table may display the different timing data in different columns, such as time in function only (TIFO) 712, total time within function 713, call count 714, TIFO average 715, average of total time 716.

The GUI 700C may comprise the graphic performance trends of each method. The user may select one of the methods within the table 720. The GUI 700C may provide the performance trend for the selected method/function. For example, the GUI 700C may display the trend for TIFO timing data in a first graph 722. Further, the GUI 700C may display the trend for total time within function in a second graph 724.

The GUI 700D may comprise the graphical performance for different runs/executions of a method. The GUI 700D may display the time in function data for each run as a line in the graph 730. For example, the graph 730 may comprise four lines for the timing data of first run, second run, third run, and fourth run of the method.

The graphical user interfaces 700A-700D may provide a number of tools including data visualizations and trend calculating tools to allow the user to review the analysis results from different angles.

Figure 8A:
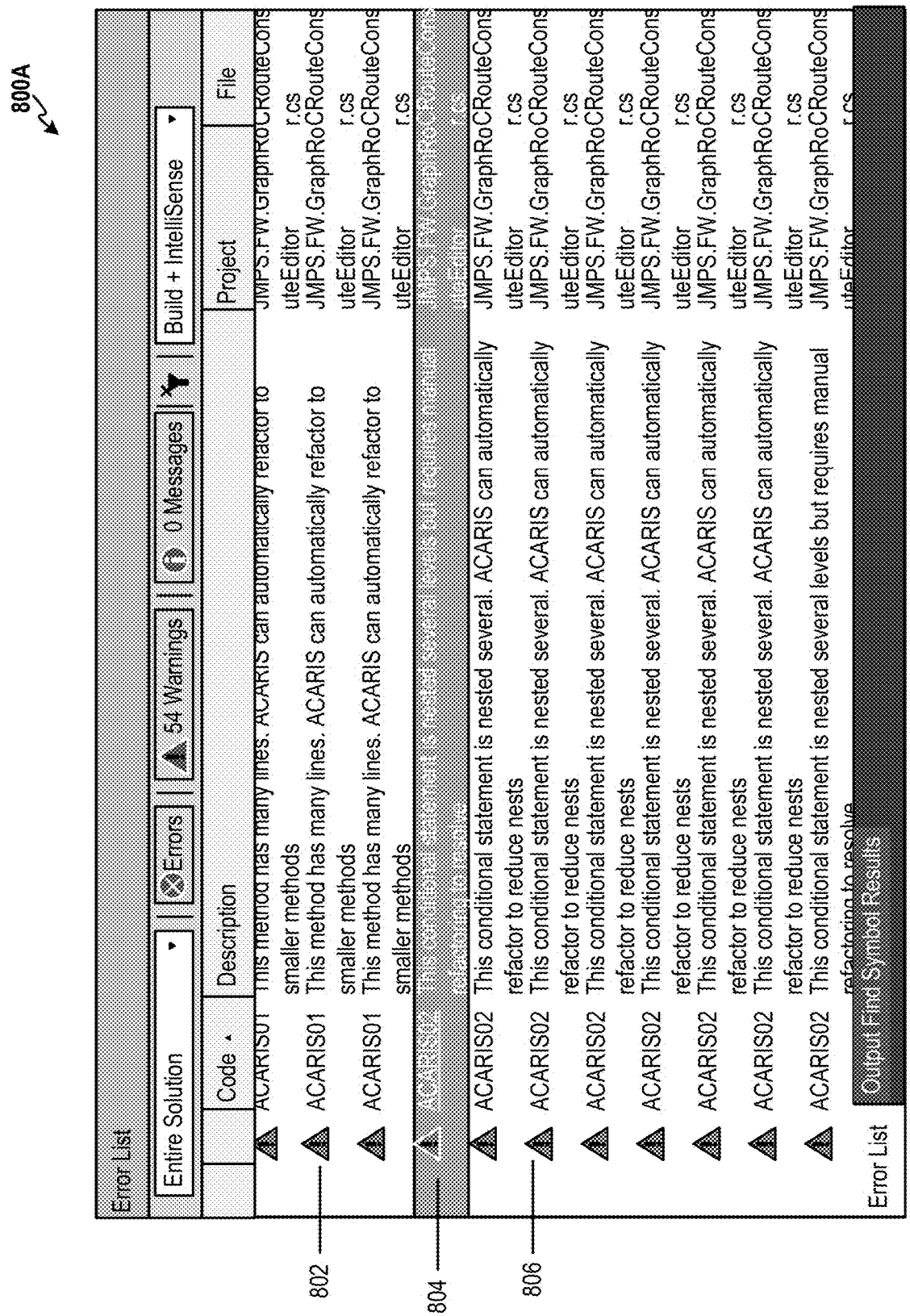
Figure 8B:
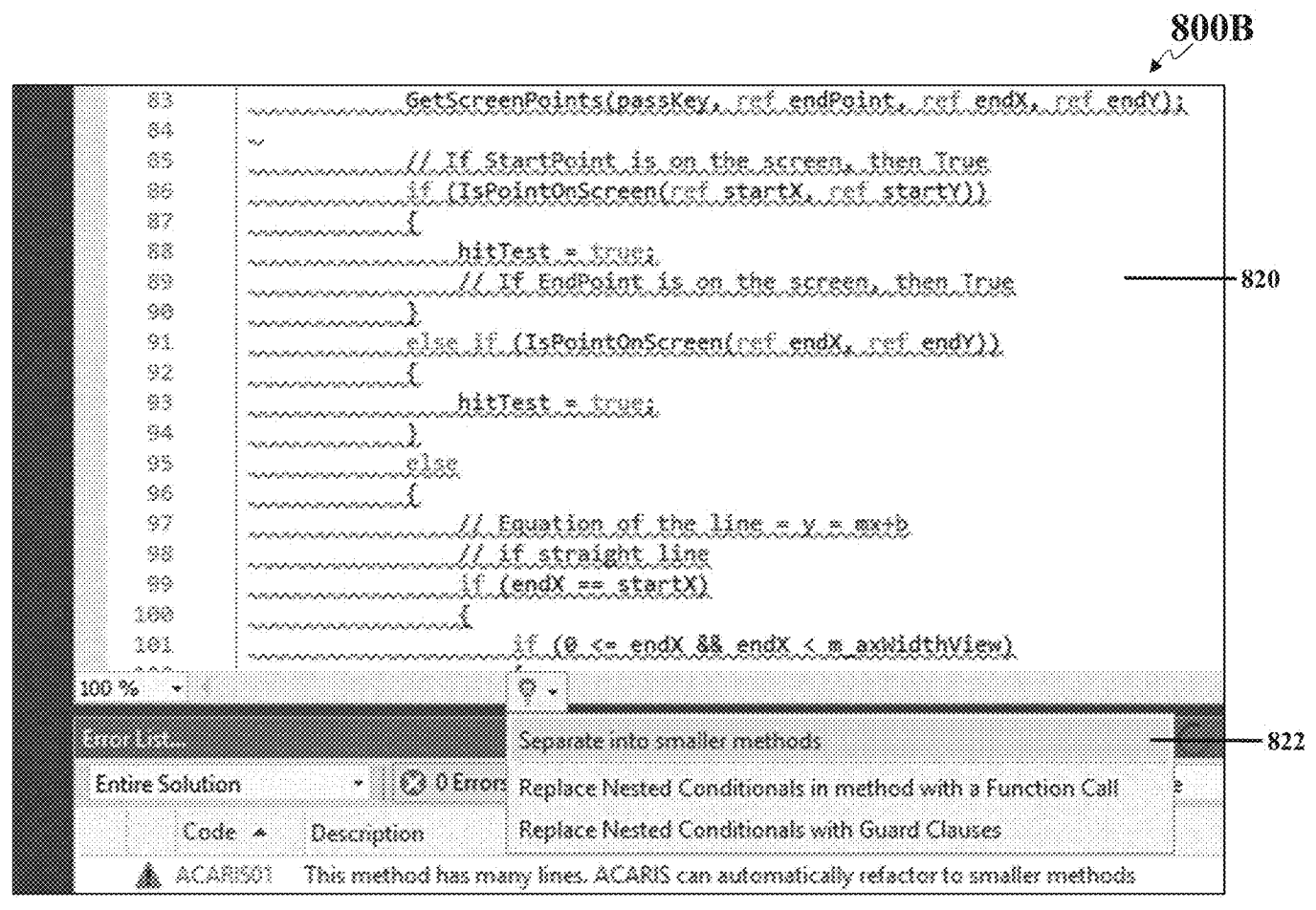

FIGS. 8A-8B illustrate graphical user interfaces 800A-800B for identifying code violations and configuring refactoring goals, according to an embodiment. The GUI 800A may display the list of code violations of the source code of legacy software. Each item in the list may be a warning describing how the source code violates the proper coding patterns. For example, a first warning 802 may describe that the method has too many lines and can be refactored to smaller methods. A second warning 804 may describe that a particular condition statement is nested several levels and require manual refactoring. A third warning 806 may describe that a condition statement is nested several levels and can be automatically refactored to reduce nests. The user may be able to select one or more warnings to address the corresponding code violations by interacting with the GUI 800A.

The GUI 800B may display the refactoring goals of source code for the user to select. The GUI 800B may comprise a window 820 containing the source code to be refactored. The GUI 800B may also comprise the refactoring goals in a menu 822. The menu 822 may comprise different refactoring goals/options to correct the code violations included in the source code.

Figure 9A-1:
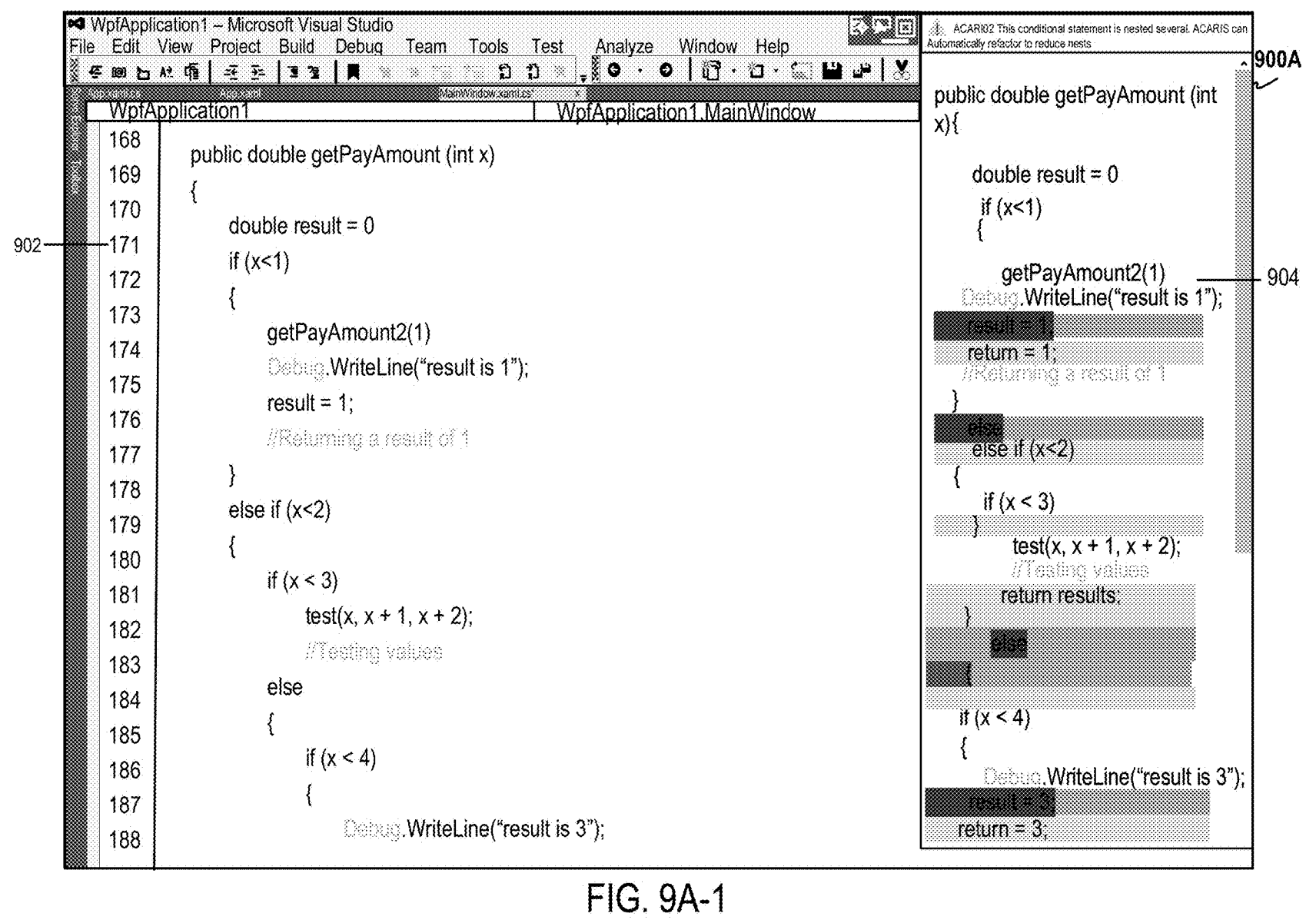
Figure 9A-2:
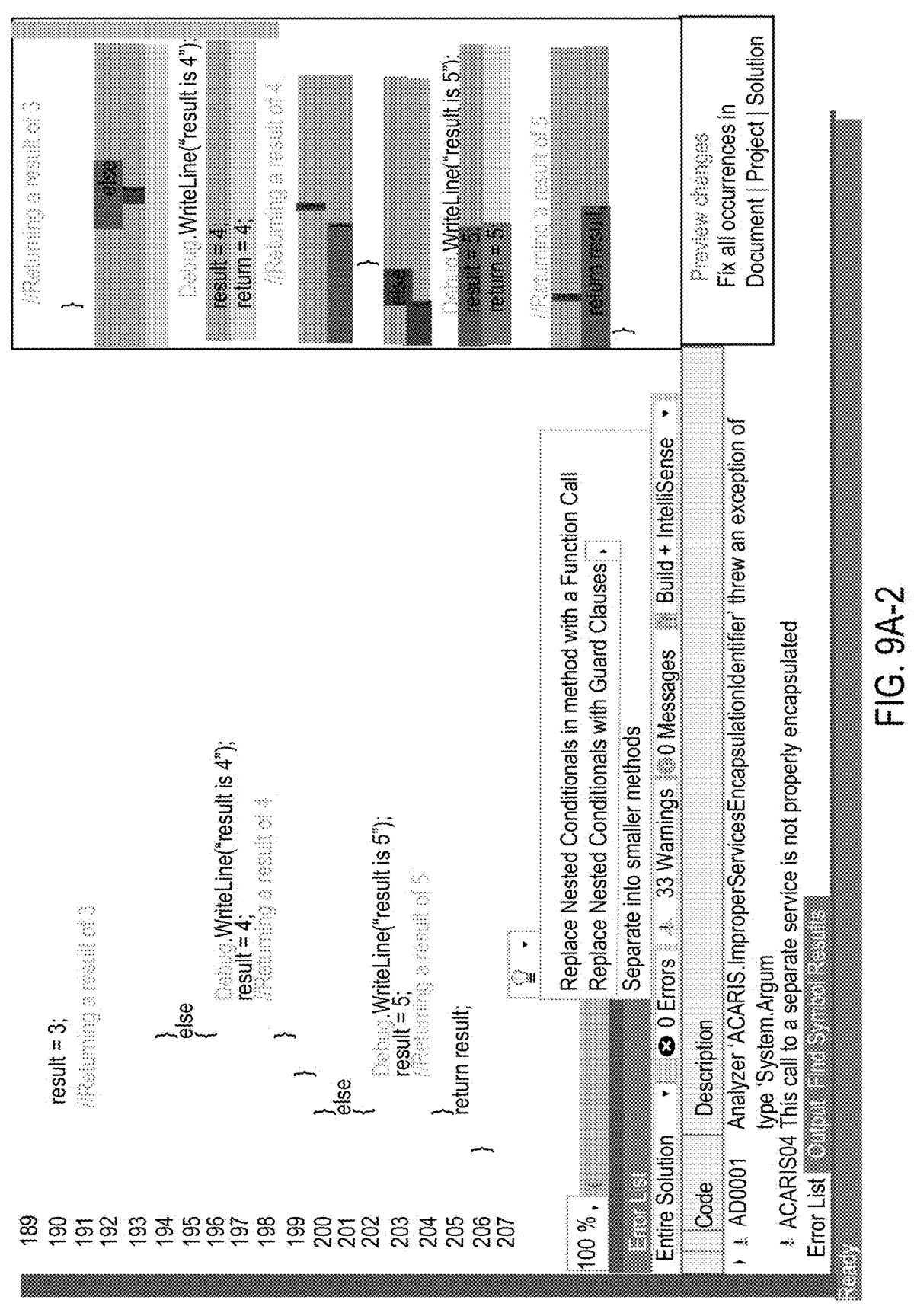
Figures 1, 9B:
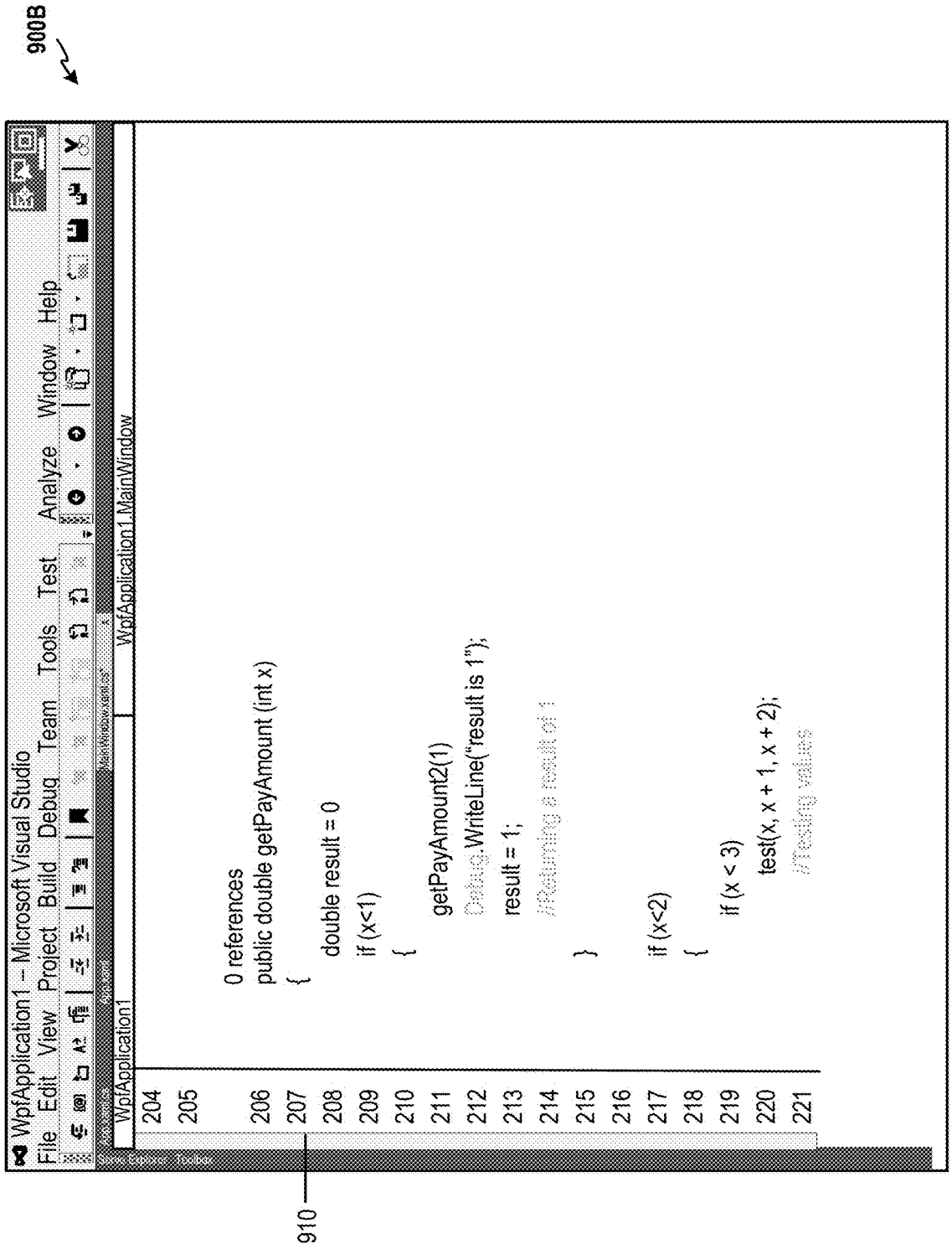
Figures 2, 9B:
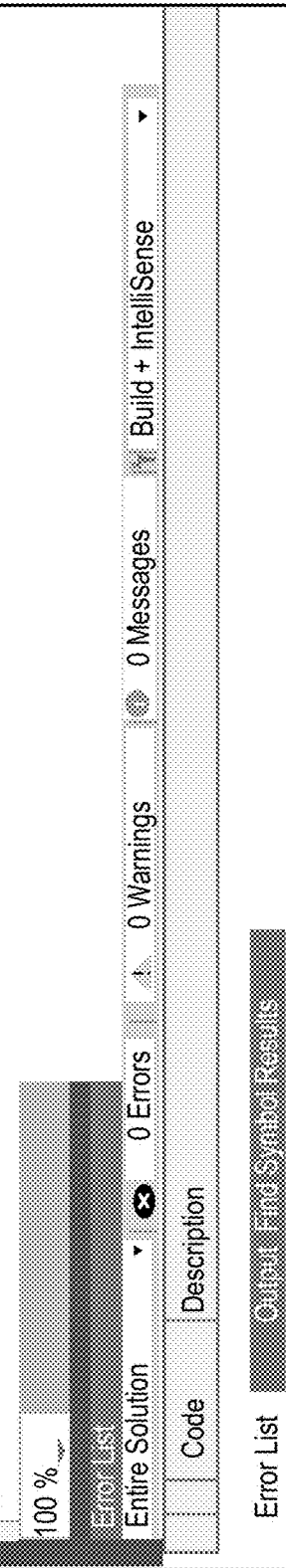

FIGS. 9A-9B illustrate graphical user interfaces 900A-900B for refactoring the source code of the legacy software, according to an embodiment. The GUI 900A may comprise the original source code 902 and the refactoring options 904 of the source code. The refactoring options 904 may include an indication of a particular code violation and suggested changes to correct or otherwise address that particular code violation. The indication of the particular code violation may be a highlight of the source code with the code violation in a particular color (or in any other patterns). For example, the computing device may mark improper source code (code violation) with red color and mark the suggested refactoring option in green color. The user may select to implement one or more suggested refactoring options by interacting with the refactoring options.

The GUI 900B may be the user interface for displaying the source code after refactoring 910. Upon receiving the user selection of the one or more refactoring options, the computing device may implement the selected options to the legacy software. For example, the computing device may alter the source code according to the selected refactoring option to remove the code violations. The refactored source code 910 may comprise proper source code after refactoring that includes no code violations.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method comprising:
    training, by a computing device, a machine learning (ML) model using historical data including a first source code of a first function, a first code violation associated with an inefficiency in the first source code of the first function, and one or more first refactoring actions identified for the first code violation;
    selecting, by the computing device, from a code base for a plurality of functions of a software program, second source code of a second function for refactoring based on a performance profile identifying a performance statistic generated for each of the plurality of functions invoked during runtime of the software program;
    identifying, by the computing device, an inefficiency corresponding to a second code violation within the second source code of the second function by providing the second source code as input to the ML model to parse the second source code of the second function for the second code violation corresponding to the inefficiency;
    determining, by the computing device, from providing the second source code as input to the ML model, one or more second refactoring actions to update the second source code based upon the inefficiency identified within the second source code; and
    generating, by the computing device, updated second source code by removing the second code violation in the second source code in accordance with a refactoring action of the one or more second refactoring actions.

2. The method of claim 1, further comprising providing, by the computing device, for presentation via a user interface, the one or more second refactoring actions to refactor the second source code to address the inefficiency.

3. The method of claim 1, further comprising receiving, by the computing device via a user interface, an identification selected from the one or more second refactoring actions to be used to refactor the second source code.

4. The method of claim 1, further comprising receiving, by the computing device via a user interface, a priority for a plurality of types of inefficiencies to select at least one of the plurality of functions of the software program for refactoring.

5. The method of claim 1, further comprising receiving, by the computing device via a user interface, a configuration defining a test session within which to generate the performance profile for the plurality of functions of the software program.

6. The method of claim 1, further comprising running, by the computing device, the software program within a test environment to generate the performance profile for the plurality of functions of the software program.

7. The method of claim 1, wherein identifying the inefficiency further comprises identifying the second code violation from within an abstract syntax tree representing a syntactic structure of the second source code.

8. The method of claim 1, wherein determining the one or more refactoring actions further comprises generating the one or more second refactoring actions to correct the second code violation identified within the second source code.

9. The method of claim 1, wherein generating the updated source code further comprises automatically selecting from the one or more second plurality of refactoring actions to refactor the second source code to address the identified inefficiency.

10. A system, comprising:
    a computing device having one or more processors coupled with memory, configured to:
        train a machine learning (ML) model using historical data including a first source code of a first function, a first code violation associated with an inefficiency in the first source code of the first function, and one or more first refactoring actions identified for the example first code violation;
        select, from code base for a plurality of functions of a software program, second source code of a second function for refactoring based on a performance profile identifying a performance statistic generated for each of the plurality of functions invoked during runtime of the software program;
        identify an inefficiency corresponding to a second code violation within the second source code of the second function by providing the second source code as input to the ML model to parse the second source code of the second function for the second code violation corresponding to the inefficiency;
        determine, from providing the second source code as input to the ML model, one or more second refactoring actions to update the second source code based upon the identified inefficiency identified within the second source code; and
        generate updated second source code by removing the second code violation in the second source code in accordance with a refactoring action of the one or more second refactoring actions.

11. The system of claim 10, wherein the computing device is further configured to provide, for presentation via a user interface, the one or more second refactoring actions to refactor the second source code to address the inefficiency.

12. The system of claim 10, wherein the computing device is further configured to receive, via a user interface, an identification selected from the one or more second refactoring actions to be used to refactor the second source code.

13. The system of claim 10, wherein the computing device is further configured to receive, via a user interface, a priority for a plurality of types of inefficiencies to select at least one of the plurality of functions of the software program for refactoring.

14. The system of claim 10, wherein the computing device is further configured to receive, via a user interface, a configuration defining a test session within which to generate the performance profile for the plurality of functions of the software program.

15. The system of claim 10, wherein the computing device is further configured to run the software program within a test environment to generate the performance profile for the plurality of functions of the software program.

16. The system of claim 10, wherein the computing device is further configured to identify the second code violation from within an abstract syntax tree representing a syntactic structure of the second source code.

17. The system of claim 10, wherein the computing device is further configured to generate the one or more second refactoring actions to correct the second code violation identified within the second source code.

18. The system of claim 10, wherein the computing device is further configured to automatically select from the one or more second refactoring actions to refactor the second source code to address the identified inefficiency.

\* \* \* \* \*